US012249025B2

(12) United States Patent
Le et al.

(10) Patent No.: US 12,249,025 B2
(45) Date of Patent: *Mar. 11, 2025

(54) HIGH-QUALITY OBJECT-SPACE DYNAMIC AMBIENT OCCLUSION

(71) Applicant: Electronic Arts Inc., Redwood City, CA (US)

(72) Inventors: Binh Huy Le, Mountain View, CA (US); John Peter Lewis, Playa Vista, CA (US)

(73) Assignee: Electronic Arts Inc., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/528,526

(22) Filed: Dec. 4, 2023

(65) Prior Publication Data
US 2024/0177411 A1 May 30, 2024

Related U.S. Application Data

(63) Continuation of application No. 17/589,620, filed on Jan. 31, 2022, now Pat. No. 11,836,851, which is a
(Continued)

(51) Int. Cl.
G06T 15/60 (2006.01)
A63F 13/52 (2014.01)
(Continued)

(52) U.S. Cl.
CPC .............. G06T 15/60 (2013.01); A63F 13/52 (2014.09); G06N 20/00 (2019.01); G06T 13/40 (2013.01);
(Continued)

(58) Field of Classification Search
None
See application file for complete search history.

(56) References Cited

U.S. PATENT DOCUMENTS 9,393,693 B1 * 7/2016 Kalakrishnan ......... B25J 9/1633
11,238,646 B2 2/2022 Le et al.
(Continued)

OTHER PUBLICATIONS

Bako et al., Kernel-predicting Convolutional Networks for Denoising Monte Carlo Renderings. ACM Trans. Graph. 36, 4 (Jul. 2017), 97: 1-97:14 (2017).
(Continued)

*Primary Examiner* — Joni Hsu
(74) *Attorney, Agent, or Firm* — Knobbe, Martens, Olson & Bear, LLP

(57) ABSTRACT

Systems and methods are disclosed for calculating dynamic ambient occlusion (AO) values for character models to yield high-quality approximations of global illumination effects. The approach utilizes a dual component machine-learning model that factorizes dynamic AO computation into a non-linear component, in which visibility is determined by approximating spheres and their casted shadows, and a linear component that leverages a skinning-like algorithm for efficiency. The parameters of both components are trained in a regression against ground-truth AO values. The resulting model accommodates lighting interactions with external objects and can be generalized without requiring carefully constructed training data.

20 Claims, 13 Drawing Sheets

Related U.S. Application Data continuation of application No. 16/581,615, filed on Sep. 24, 2019, now Pat. No. 11,238,646.

(60) Provisional application No. 62/735,648, filed on Sep. 24, 2018.

(51) Int. Cl.

| | | |
|---|---|---|
| *G06N 20/00* | (2019.01) | |
| *G06T 13/40* | (2011.01) | |
| *G06T 15/06* | (2011.01) | |
| *G06T 15/10* | (2011.01) | |
| *G06T 15/50* | (2011.01) | |

(52) U.S. Cl.
CPC .............. *G06T 15/06* (2013.01); *G06T 15/10* (2013.01); *G06T 15/506* (2013.01); *A63F 2300/6607* (2013.01); *A63F 2300/6646* (2013.01)

(56) References Cited

U.S. PATENT DOCUMENTS

| | | | |
|---|---|---|---|
| 2009/0153557 | A1 | 6/2009 | Dimitrov et al. |
| 2011/0032328 | A1 | 2/2011 | Raveendran et al. |
| 2019/0172265 | A1 | 6/2019 | Cossairt et al. |
| 2019/0205616 | A1 | 7/2019 | Hong |
| 2022/0237860 | A1 | 7/2022 | Le et al. |

OTHER PUBLICATIONS

Bunnell, Dynamic Ambient Occlusion And Indirect Lighting. vol. 2. 223-233 (2005).
http://http.download.nvidia.com/developer/GPU_Gems_2/GPU_Gems2_ch14.pdf.
Chakravarty et al., Interactive Reconstruction of Monte Carlo Image Sequences Using a Recurrent Denoising Autoencoder. ACM Trans. Graph. 36, 4, Article 98 (Jul. 2017), 12 pages (2017).
Christensen, Note #35: Ambient Occlusion, Image-Based Illumination, and Global Illumination. PhotoRealistic RenderMan Application Notes (2002).
Christensen et al., The Path to Path-Traced Movies. Found. Trends. Comput. Graph. Vis. 10, 2 (Oct. 2016), 103-175 (2016).
Dutre et al., Advanced Global Illumination. AK Peters Ltd., in 36 pages, which includes the Table of Contents and Frontmatter (2006).
Fletcher, Practical Methods of Optimization; (2nd Ed.). Wiley-Interscience, in 14 pages, which includes the Table of Contents and Frontmatter (1987).
James et al., Skinning Mesh Animations. ACM Trans. Graph. 24, 3 (Jul. 2005), 399-407 (2005). https://doi.org/10.1145/1073204.1073206.
Kavan et al., Least Squares Vertex Baking. In Proceedings of the 22nd Eurographics Conference on Rendering (EGSR '11). 1319-1326 (2011).
Kirk et al., Real-time Ambient Occlusion for Dynamic Character Skins. In Proceedings of the 2007 Symposium on Interactive 3D Graphics and Games (I3D '07). ACM, New York, NY, USA, 47-52 (2007).
Kontkanen et al., Ambient Occlusion for Animated Characters. In Proceedings of the 17th Eurographics Conference on Rendering Techniques (EGSR '06). Eurographics Association, Aire-la-Ville, Switzerland, Switzerland, 343-348 (2006).
Lacewell, Baking With OptiX (2016).
https://developer.nvidia.com/optix-prime-baking-sample.
Le et al., Real-time Skeletal Skinning with Optimized Centers of Rotation. ACM Trans. Graph. 35, 4, Article 37 (Jul. 2016), 10 pages (2016). (Uploaded in 3 parts.).
https://doi.org/10.1145/2897824.2925959.
Mazonka, Solid Angle of Conical Surfaces, Polyhedral Cones, and Intersecting Spherical Caps. arXiv:arXiv:1205.1396 (2012).
Mittring, Finding Next Gen: CryEngine 2. In ACM SIGGRAPH 2007 Courses (SIGGRAPH '07). ACM, New York, NY, USA, 97-121 (2007).
https://doi.org/10.1145/1281500.1281671.
Ren et al., Real-time Soft Shadows in Dynamic Scenes Using Spherical Harmonic Exponentiation. ACM Trans. Graph. 25, 3 (Jul. 2006), 977-986 (2006).
RTX 2018. NVIDIA Developer Blog: Introduction to NVIDIA RTX and DirectX Ray Tracing (2018).

\* cited by examiner

| Vanguard | Maria | Warrok |
|---|---|---|
| $n = 5,890$ $m = 65$ $f = 21,438$ $size_{data} \approx 652$ MB | $n = 8,876$ $m = 66$ $f = 23,131$ $size_{data} \approx 970$ MB | $n = 6,557$ $m = 65$ $f = 21,438$ $size_{data} \approx 706$ MB |
| $s = 81$ $p = 500$ | $s = 130$ $p = 500$ | $s = 77$ $p = 500$ |
| $MSE_{init} = 1.85e{-}3$ $MSE_{min} = 0.67e{-}3$ $time \approx 5.5$ h $iters = 160$ $size_{model} = 563$ KB | $MSE_{init} = 1.30e{-}3$ $MSE_{min} = 0.59e{-}3$ $time \approx 14$ h $iters = 311$ $size_{model} = 820$ KB | $MSE_{init} = 1.69e{-}3$ $MSE_{min} = 0.56e{-}3$ $time \approx 12$ h $iters = 500$ $size_{model} = 598$ KB |

FIG. 7

HIGH-QUALITY OBJECT-SPACE DYNAMIC AMBIENT OCCLUSION

INCORPORATION BY REFERENCE TO ANY PRIORITY APPLICATIONS

Any and all applications for which a foreign or domestic priority claim is identified in the Application Data Sheet as filed with the present application are incorporated by reference under 37 CFR 1.57 and made a part of this specification.

FIELD OF THE DISCLOSURE

The described technology generally relates to computer technology and computer graphics techniques. More specifically, this disclosure relates to techniques for ambient occlusion usable for producing global illumination effects in character animation.

BACKGROUND

Modern computer-generated graphics allow for the rendering of very detailed and realistic-looking scenes (e.g., for video games or animated films) through the use of specialized graphical hardware and software. However, realistic images require global illumination (e.g., realistic lighting) effects, and the direct computation of global illumination is currently not possible for real-time applications (e.g., video games). This is because the accurate determination of global illumination in real-time remains computationally difficult, and the global illumination for single images of complex scenes can take minutes or hours to compute.

It may eventually be possible to perform direct computation of global illumination in real-time. For instance, hardware support for ray tracing may address this problem in the future and enable lighting effects such as refraction, order-independent transparency, and complex shadows that are difficult or impossible to achieve with existing real-time rendering techniques. However, existing hardware solutions are limited and fall short of the performance needed to render complete complex scenes in real time. Alternatively, it may be possible to use machine learning techniques to filter and inpaint incomplete and high-variance samples from monte-carlo rendering that has not yet run to convergence. While extremely promising, employing these machine learning techniques on current hardware still falls short of the performance needed to produce production-quality complex scenes in real-time.

These restrictions in computing global illumination have resulted in the development of various graphical techniques, such as shadow mapping, horizon mapping, precomputed radiance transfer, and others, that cheaply approximate some of the first order effects of global illumination. Such methods of approximation (e.g., "workarounds" or "cheats") are faster and easier to perform computationally, and some algorithms may even be used together to yield results that may not necessarily be accurate, but have an adequately realistic effect.

Among these, ambient occlusion (AO) is a proven technique that is widely used in real-time applications such as video games. The AO value for every surface point in a 3D scene is defined as its exposure to the ambient lighting. Equivalently, the AO value at a point can be computed from the amount of shadow from all other points casting on it. Under the assumption of static geometry, AO values can be precomputed and stored in a texture for use in a real-time shader, where the value simply attenuates the indirect lighting component.

However, this sort of precomputation generally does not faithfully capture the global illumination associated with dynamic, animated, and deformable objects. Furthermore, the computation of true AO values for animated objects such as characters (e.g., human character models) can be computationally expensive. This has led to methods such as screen-space ambient occlusion (SSAO), which serve as a faster approximation of true ambient occlusion. SSAO uses pixel depth rather than scene geometry to form an ambient occlusion map, which efficiently approximates AO using only screen-space (e.g. deferred shading) information available at run-time, thereby allowing AO for dynamic objects. However, SSAO is a further approximation on AO (e.g., it is an approximation of an approximation), and is limited to relatively short-range effects that can be computed from screen-space information. As a result, while games and other interactive experiences often have very realistic background elements such as vehicles, the characters (which are often the main point of interest) fall short.

Accordingly, there exists a need for ambient occlusion techniques that can be used to quickly, efficiently, and more-accurately approximate true ambient occlusion for 3D scenes containing dynamic or animated objects (such as characters) in real-time. This would improve the detail and realism of the lighting effects applied to animated objects in the scenes that are rendered and displayed by real-time applications. Embodiments of the present disclosure address these issues and more.

SUMMARY OF THE DISCLOSURE

Disclosed herein are systems and methods for high-quality object-space dynamic ambient occlusion (referred to herein as "DAO"), which takes advantage of a custom machine learning regression approach to compute dynamic AO in object space for characters. A model with two separate components can be used to factorize dynamic AO computation into a non-linear component, in which visibility is determined by approximating spheres and their casted shadows, and a linear component that leverages a skinning-like algorithm for efficiency. The parameters of both components are trained in a regression against ground-truth AO values. The resulting model can be used to calculate dynamic ambient occlusion for character models that are high-quality approximations of global illumination effects, can easily allow for lighting interactions between the character model and other characters or external objects, and can be generalized without requiring carefully constructed training data.

Accordingly, in various embodiments, large amounts of data are automatically and dynamically calculated interactively in response to user inputs, and the calculated data can be efficiently and compactly presented to a user by the system. Thus, in some embodiments, the user interfaces described herein are more efficient as compared to previous user interfaces in which data is not dynamically updated and compactly and efficiently presented to the user in response to interactive inputs.

Various aspects of the novel systems, apparatuses, and methods are described more fully hereinafter with reference to the accompanying drawings. Aspects of this disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the novel systems, apparatuses, and methods disclosed herein, whether implemented independently of or combined with any other aspect. For example, an apparatus may be implemented or a method may be practiced using any number of the aspects set forth herein. In addition, the scope is intended to encompass such an apparatus or method which is practiced using other structure, functionality, or structure and functionality in addition to or other than the various aspects set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to any systems and/or devices that could benefit from universal facial expression. The detailed description and drawings are merely illustrative of the disclosure rather than limiting, the scope of the disclosure being defined by the appended claims and equivalents thereof.

In various embodiments, systems and/or computer systems are disclosed that comprise computer readable storage media having program instructions embodied therewith, and one or more processors configured to execute the program instructions to cause the one or more processors to perform operations comprising one or more aspects of the above- and/or below-described embodiments (including one or more aspects of the appended claims).

In various embodiments, computer-implemented methods are disclosed in which, by one or more processors executing program instructions, one or more aspects of the above- and/or below-described embodiments (including one or more aspects of the appended claims) are implemented and/or performed.

In various embodiments, computer program products comprising computer readable storage media are disclosed, wherein the computer readable storage media have program instructions embodied therewith, the program instructions executable by one or more processors to cause the one or more processors to perform operations comprising one or more aspects of the above- and/or below-described embodiments (including one or more aspects of the appended claims).

BRIEF DESCRIPTION OF THE DRAWINGS

The following drawings and the associated description herein are provided to illustrate specific embodiments of the disclosure and are not intended to be limiting.

FIG. 7 illustrates a table containing statistics associated with three character models used to test a dynamic ambient occlusion approach, in accordance with embodiments of the present invention.

DETAILED DESCRIPTION

Figure 1:
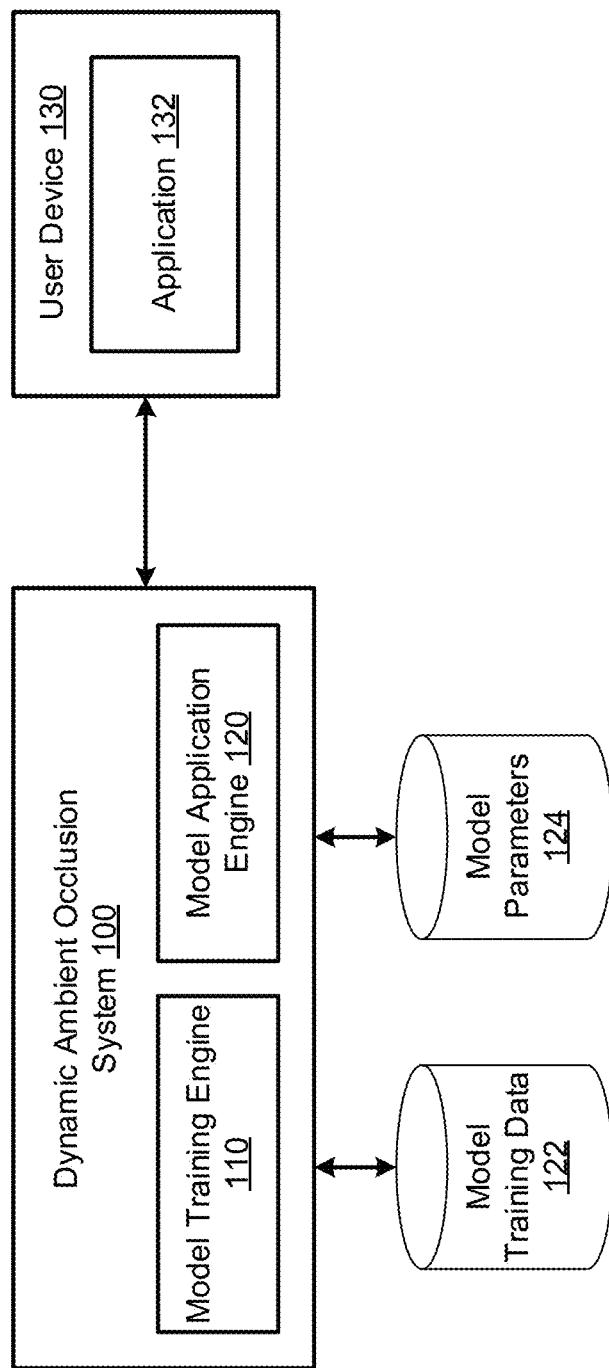
FIG. 1 illustrates a block diagram of an example dynamic ambient occlusion system, in accordance with embodiments of the present invention.

This specification describes systems and methods for calculating dynamic ambient occlusion values for character models to yield high-quality approximations of global illumination effects. The approach utilizes a dual component machine-learning model that factorizes dynamic AO computation into a non-linear component and a linear component.

The non-linear component determines visibility by approximating spheres and their casted shadows. More specifically, it transforms a character model into an arrangement of proxy spheres and key points, with each proxy sphere rigidly bounded to one of the bones in the skeletal structure of the character model. The positions of the proxy spheres and key points in the arrangement depend on the pose of the character model relative to a rest pose. All proxy spheres in the arrangement are treated as shadow emitters that cast a shadow on every key point, which are treated as shadow receivers, and the shadow contributions from all the proxy spheres on a key point can be summed together to obtain key point shadow values.

The linear component then applies a skinning-like algorithm using the key point shadow values for efficiency, in order to up-sample and apply the key point shadow values to obtain AO values across the entire character model. More specifically, the AO at any location can be determined based on the shadow values associated with surrounding key points, allowing the AO for each vertex of the character model to be determined.

The parameters of both components, which control the transformations of proxy spheres, the transformations of key points, and the per-vertex AO calculations are optimized through the machine-learning model by training them in a regression against ground-truth AO values, such as AO values obtained from ray tracing techniques. The resulting model is very flexible and can accommodate lighting interactions of the character model with external objects and can be generalized without requiring carefully constructed training data.

In order to facilitate an understanding of the systems and methods discussed herein, a number of terms are described below. The terms described below, as well as other terms used herein, should be construed broadly to include the provided definitions, the ordinary and customary meaning of the terms, and/or any other implied meaning for the respective terms.

As used herein in reference to user interactions with data displayed by a computing system, "user input" is a broad term that refers to any type of input provided by a user that is intended to be received and/or stored by the system, to cause an update to data that is displayed by the system, and/or to cause an update to the way that data is displayed by the system. Non-limiting examples of such user input include keyboard inputs, mouse inputs, digital pen inputs, voice inputs, finger touch inputs (e.g., via touch sensitive display), gesture inputs (e.g., hand movements, finger movements, arm movements, movements of any other appendage, and/or body movements), and/or the like. Additionally, user inputs to the system may include inputs via tools and/or other objects manipulated by the user. For example, the user may move an object, such as a tool, stylus, or wand, to provide inputs. Further, user inputs may include motion, position, rotation, angle, alignment, orientation, configuration (e.g., fist, hand flat, one finger extended, etc.), and/or the like. For example, user inputs may comprise a position, orientation, and/or motion of a hand and/or a 3D mouse.

As used herein, a data store can refer to any computer readable storage medium and/or device (or collection of data storage mediums and/or devices). Examples of data stores include, but are not limited to, optical disks (e.g., CD-ROM, DVD-ROM, etc.), magnetic disks (e.g., hard disks, floppy disks, etc.), memory circuits (e.g., solid state drives, random-access memory (RAM), etc.), and/or the like. Another example of a data store is a hosted storage environment that includes a collection of physical data storage devices that may be remotely accessible and may be rapidly provisioned as needed (commonly referred to as "cloud" storage).

As used herein, a database can refer to any data structure (and/or combinations of multiple data structures) for storing and/or organizing data, including, but not limited to, relational databases (e.g., Oracle databases, mySQL databases, and so on), non-relational databases (e.g., NoSQL databases, and so on), in-memory databases, spreadsheets, as comma separated values (CSV) files, eXtendible markup language (XML) files, TeXT (TXT) files, flat files, spreadsheet files, and/or any other widely used or proprietary format for data storage. Databases are typically stored in one or more data stores. Accordingly, each database referred to herein (e.g., in the description herein and/or the figures of the present application) is to be understood as being stored in one or more data stores.

Background on Ambient Occlusion

Ambient occlusion (AO) is a technique that is widely used in real-time applications such as video games in order to approximate some of the first order effects of global illumination. The AO value for every surface point in a 3D scene is defined as its exposure to the ambient lighting (e.g., on a normalized scale between 0 and 1). Equivalently, the AO value at a point can be computed from the amount of shadow from all other points casting on it. Under the assumption of static geometry, AO values can be precomputed and stored in a texture for use in a real-time shader, where the value simply attenuates the indirect lighting component.

Although the precomputation of AO values is often an acceptable approximation of global illumination for static objects, these traditional approaches do not faithfully capture global illumination when objects are moving and dynamic (e.g., deformable), such as, for instance, character models. For example, the precomputation of AO values cannot produce dynamic AO effects on characters, such as the dynamically changing occlusion around the elbow or knees as they bend, or the effect of holding a hand close to the body.

The main existing solution for dynamic AO is screen space ambient occlusion (SSAO). SSAO rasterizes the scene to a depth buffer and uses this as a surrogate for the original geometry for the purpose of AO computation. For each pixel in this depth buffer, SSAO also discards the shadowing effect of distant pixels to reduce the computation. SSAO is widely used because it is independent of scene complexity and handles dynamic geometry. However, because of these two strategies, SSAO typically has artifacts (as shown by character model 904 in FIG. 9). SSAO only generates shadows locally, e.g. near the creases, and these shadows fall off too quickly with distance. SSAO can also discard the shadow contribution of geometry hidden from the camera view.

Some approaches have been proposed to formulate the problem of real-time computation of ambient occlusion as a regression from screen-space input data to the ground-truth AO (e.g., true AO values) [Holden et al. 2016; Nalbach et al. 2017]. Since the AO values used to train the regression can be precomputed using high-quality global-illumination, the results improve upon SSAO. However, effects that cannot be deduced purely from screen-space information are still difficult to handle using these methods. Unfortunately characters prominently feature one such effect: occlusions caused by limbs, such as the case where an arm crosses in front of the torso, (as seen for example in character model 904 of FIG. 9). Depending on the distance between the arm and torso, AO may or may not be required, but this is difficult to entirely deduce from only local screen-space information. Given the importance of characters, methods that handle this problem are required.

There have been some proposed approaches that are specifically directed towards handling dynamic AO targeted to characters. One approach formulates the problem as a linear regression from the character's pose to the AO value [Kontkanen and Aila 2006]. This method is both particularly simple and efficient—however, the restriction to linear regression may limit the types of lighting effects that are obtained.

Another proposed approach for a dynamic AO method for characters moves beyond the linearity restriction by using a "piecewise linear" collection of locally linear models [Kirk and Arikan 2007]. More specifically, character poses are clustered using k-Means, the representation for each pose is compressed using principal component analysis (PCA), and AO is represented as a function of the pose. A moving least squares step is used to smooth the boundaries in pose space between the local linear models. However, such an approach requires careful tuning of several types of parameters. Artifacts result if too few clusters are used or if the retained dimensionality of the PCA is too small, but on the opposite end of the spectrum, values too large result in excess memory use (and to a lesser extent, unneeded computation). The number of clusters needed may vary depending on the type of motion, and one must ensure that the motion sample used for clustering contains the range of poses that will be encountered online. Further, the results of this k-Means algorithm depend on its initialization (which is usually random), so several iterations of trial-and-error tuning may be required in the worst case.

Thus, the idea of dynamic AO algorithms for characters has been contemplated. However, these previously proposed approaches have some trade-offs that affect their viability, in terms of the range of effects that can be obtained or the amount of parameter tuning required.

Introduction to High-quality Object-space Dynamic Ambient Occlusion

Disclosed herein are systems and methods for high-quality object-space dynamic ambient occlusion (referred to herein as "DAO"), which takes advantage of a custom machine learning regression approach to compute dynamic AO in object space for characters. The DAO approach disclosed herein has the capability of generating very high quality results (e.g., as compared to true AO values) while being easy to use, and it greatly outperforms current AO methods (including the aforementioned approaches directed to dynamic AO targeted to characters).

The underlying concept behind the DAO approach disclosed herein is to factorize the computation of dynamic AO for character models into two separate components: a non-linear, coarse resolution component and a high-resolution, linear interpolation component (these two components are also referred to herein as a non-linear layer and a linear layer, respectively). The non-linear, coarse resolution component captures the non-linear articulation effects of the body, while the higher-resolution linear interpolation component leverages the low-dimensional computation and hardware support of a skinning model (e.g., such as linear blend skinning, also known as smooth skinning decomposition or skeletal subspace deformation (SSD), which treats the surface or skin of a character model as a continuous mesh attached to an underlying skeletal structure). These two components may be used together in the calculation of dynamic AO for a character model having a certain pose. Decomposing the problem into these two components resembles some radiosity approaches, which decompose the scene into emitters (similar to our course-resolution component) and receivers (analogous to our high-resolution component).

The DAO approach described herein has numerous advantages. The approach is highly compatible with the de-facto skinning model (linear blend skinning) used throughout the industry, which provides both flexibility and good generalization. Additionally, the model can be individually trained on different character models (e.g., training one instance of the model for the various poses associated with a particular character model) and the various trained instances of the model corresponding to multiple characters may be combined in a manner such that they interact with each other in a unified manner in order to yield better results. Furthermore, the approach employs non-linear kernel functions and a solution that is differentiable through its entire useful range, while closely approximating the closed-form solution. Additionally, the approach herein has no requirement for an exhaustive set of training data that anticipates and teaches on the poses to be encountered at runtime, as it can be successfully generalized to a variety of character poses from very generic training data. Furthermore, unlike some machine learning models, this DAO approach provides interpretability that enables easy manipulations such as character-to-character interactions. The approach can easily approximate shadowing with the ground and interaction with other characters. Additionally, the approach requires very limited parameter tuning since the model utilizes few tunable parameters and is free of stochastic computations (such as k-means initialization) that may need to be re-run multiple times. Furthermore, multi-part models can be handled through the use of skinning weights due to robust initialization. Caching can be used to obtain fast value and gradient calculations. In summary, the DAO approach described herein offers a solution for computing dynamic AO of characters that is fast, robust, and has better generalization than previous character-specific methods, which can be confirmed by comparing the results of the DAO approach to other AO methods.

The accuracy of the DAO approach described herein may potentially be improved by using a more varied set of sample poses for the training data. The disclosed results were generated using the DAO approach involved the implementation of a basic sampling strategy for poses is basic, and improved pose sampling strategy could potentially be used to obtain a more effective set of sample poses.

Additionally, a current limitation with the DAO approach may be the long training time for the machine learning module, which may be improved by exploring batch optimization methods or deploying parallel implementation at larger scale (e.g. on clusters), which could be more suitable for industrial production.

The DAO approach described herein may be employed as a stand-alone method, or it may be implemented within the framework and context of a system. With respect to the figures, FIG. 1 illustrates a block diagram of an example dynamic ambient occlusion (DAO) system 100. The DAO system 100 can be a system of one or more computers, one or more virtual machines executing on a system of one or more computers, and so on. The DAO system 100 may be in communication with a user device 130 of a user (e.g., an end-user viewing a scene rendered in real-time). The user device 130 can be a desktop computer system, a laptop, a tablet, a mobile device, a wearable computer, and so on. Optionally, the DAO system 100 may be connected (e.g., a wireless or wired connection) to a display, and the DAO system 100 may be directly utilized to render graphics in real-time. In some embodiments, an application 132 may operate on the user device 130, with the application 132 configured to render computer graphics in real-time (e.g., the application 132 can be an interactive video game), and the DAO system 100 may be configured to communicate with the user device 130 through the application 132.

In some embodiments, the DAO system 100 may be able to train, maintain, and apply a machine learning model for calculating ambient occlusion values of all the points on the surface of an animated object as the object changes poses, such as the vertices of a single continuous mesh used to model the skin of a character model as the character changes poses. The machine learning model may include various parameters associated with determining ambient occlusion values based on inputs of a character model and its pose, and those optimal parameter values may be determined by training the machine learning model using training data.

In some embodiments, the DAO system 100 may be able to apply the machine learning model in real-time (e.g., on behalf of an application 132 running on user device 130), such as by applying the optimized model parameters to a character model and its current pose in a graphics scene in order to calculate the ambient occlusion values for that character model. The DAO system 100 can then send the ambient occlusion values to the application 132 on user device 130 to apply towards rendering the graphics scene.

In some embodiments, the DAO system 100, some of the components of the DAO system 100, or some of the functionality of DAO system 100 may be integrated with the application 132 of the user device 130. For instance, the application 132 of the user device 130 may be provided with the model and the model parameters (e.g., resulting from training performed by the DAO system 100) in order to perform real-time calculations of ambient occlusion values (e.g., on the user device 130) instead of relying on the DAO system 100 to compute those values. In other words, the DAO system 100 can send model parameters 124 to the user device 130, and the user device 130 may have the model application engine 120 (e.g., separately or within the application 132). The user device 130 can execute the application 132 to run that model application engine 120 with the received model parameters 124 (e.g., on the user device 130).

In some embodiments, the DAO system 100 may include a model training engine 110 that is configured to utilize model training data 122 for training a machine learning model. Training the machine learning model may result in the generation of parameter values associated with the model, which can be saved as model parameters 124. In some embodiments, the model training engine 110 may be able to update the model parameters 124 and improve the accuracy of the ambient occlusion values approximated by the model as additional training data is provided and learned by the model. The DAO system 100 may provide these updated model parameters to the application 132 for use in performing real-time calculations of AO values.

In some embodiments, the DAO system 100 may include a model application engine 120 that is capable of utilizing the model and the model parameters 124 in order to calculate ambient occlusion values for a dynamic object in a graphics scene based on the orientation or pose of the object. For instance, instead of the application 132 directly calculating the AO values, the application 132 may request that the DAO system 100 apply the machine learning model on its behalf in order to calculate the AO values for a dynamic character model having a particular pose in a graphics scene.

Overview of High-quality Object-space Dynamic Ambient Occlusion

Figure 2A:
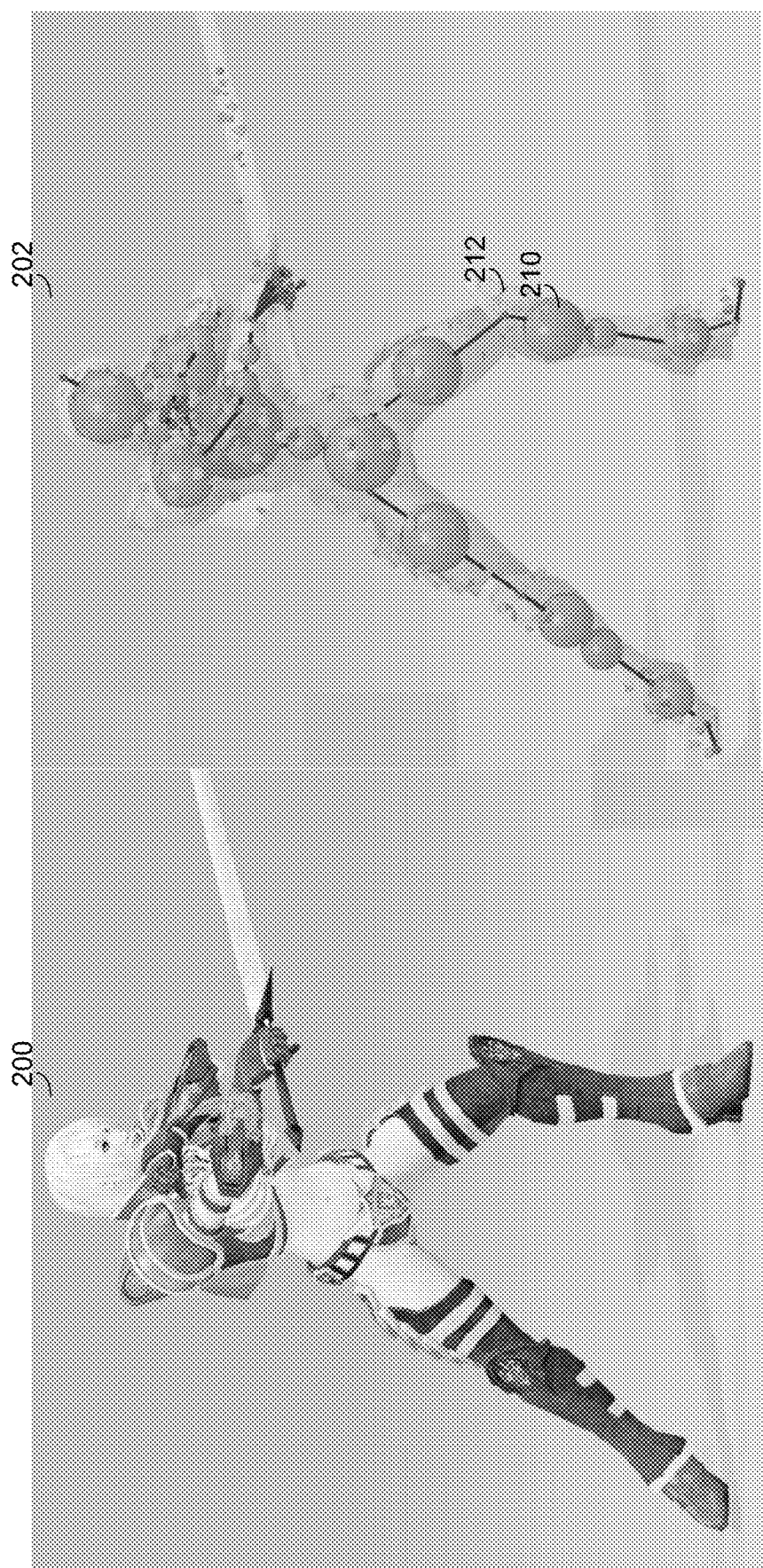
FIG. 2A illustrates a transformation of a character model into an arrangement 202 of proxy spheres and key points, in accordance with embodiments of the present invention.

The computing model for the DAO approach utilizes two separate components or layers. The first layer is a dense, non-linear layer that transforms a character model into an arrangement of proxy spheres and key points, with each proxy sphere rigidly bounded to one of the bones in the skeletal structure of the character model. This can be better visualized in FIG. 2A, in which a character model 200 has been transformed into an arrangement 202 of proxy spheres and key points. An example key point 212 in the arrangement 202 is identified, as well as an example proxy sphere 210.

This non-linear layer computes the transformed proxy spheres and key points (with their normals) from their rest pose. All proxy spheres are treated as shadow emitters that cast a shadow on every key point, which are treated as shadow receivers. The dense combination (Cartesian product) of proxy spheres and key points captures the global interaction between parts of the character model when its pose changes. For any particular key point, the shadow cast by each proxy sphere on that particular key point is computed, and the contributions from all the proxy spheres are added together to obtain a shadow value for that key point. In other words, this non-linear layer outputs a low resolution occlusion map stored at each key point.

Figure 2B:
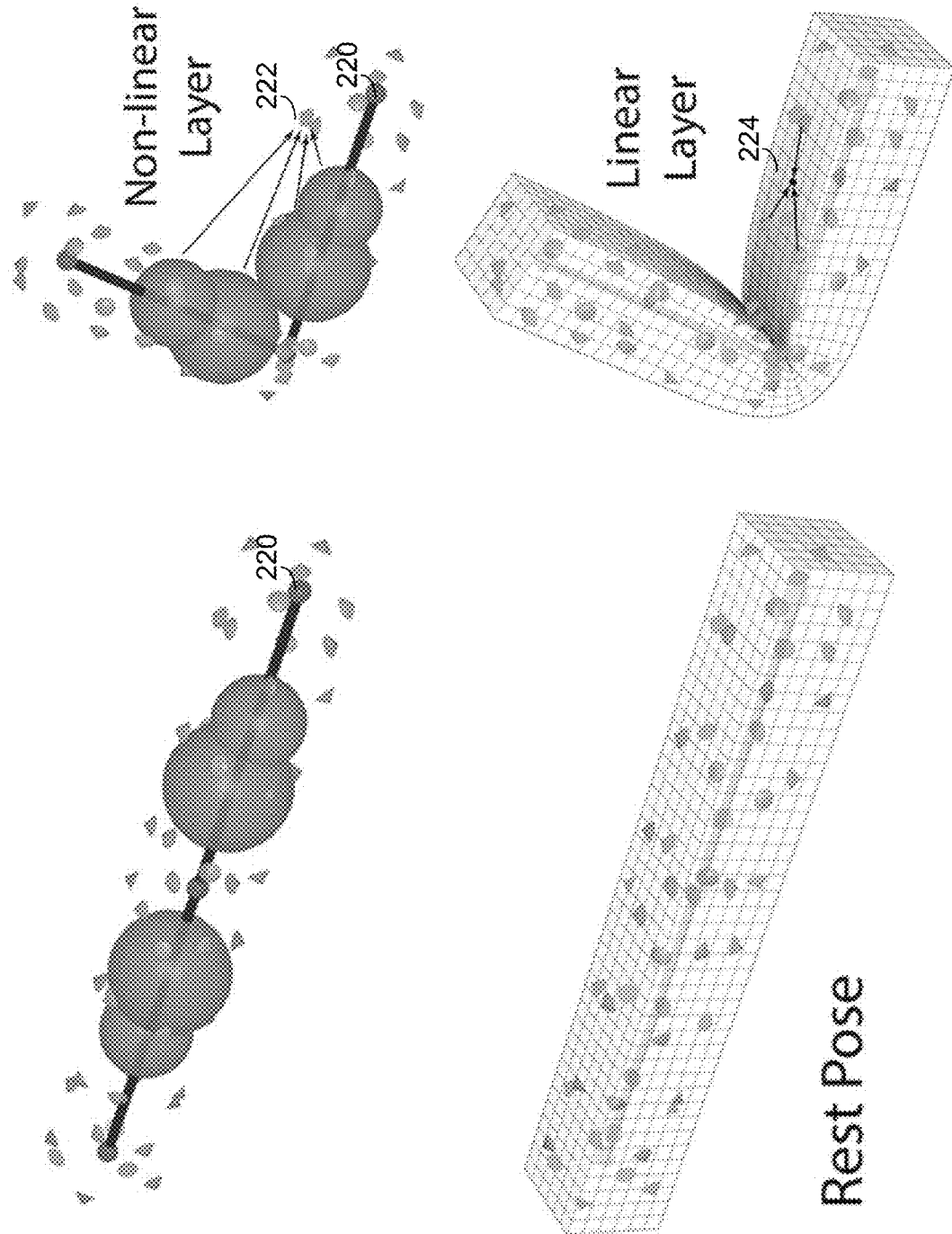
FIG. 2B illustrates the dependency of a vertex AO value on proxy sphere positioning and character model pose under a dynamic ambient occlusion approach, in accordance with embodiments of the present invention.

The second layer is a sparse, linear layer that up-samples the low resolution occlusion map to the whole model, i.e. per-vertex AO output, where the AO at each vertex (e.g., vertex on the surface of the skin of the character model) can be linearly inferred from some nearest key points. In other words, the AO value at any particular vertex is interpolated by applying a function to the shadow values of key points neighboring that particular vertex. By combining the two layers, the resulting per-vertex AO values are computed for a given pose of the character model. This is illustrated in FIG. 2B, which shows a non-linear layer with transformed key points and four transformed proxy spheres anchored to "bones" of a skeletal structure 220 in two different poses (one of which is a rest pose). When the pose of the skeletal structure 220 changes from the rest pose, the positions of the proxy spheres and key points change. The shadow value for key point 222, which is based on the shadow cast by each of the four proxy spheres, would factor in the changed positions of the proxy spheres. In the linear layer, the AO value of a vertex can be interpolated from shadow values of surrounding key points. For instance, the AO value for vertex 224 can be determined from the three neighboring key points shown by the arrow. Since the shadow values of those three key points factor in the changed positions of the proxy spheres due to the change in pose, the AO value for vertex 224 will also factor in the change in pose.

The transformations of proxy spheres, the transformations of key points, and the per-vertex AO interpolations are controlled by parameters that are optimized through the machine-learning model by fitting the parameters to the training data, in order to achieve computed per-vertex AO values that are closest to the ground-truth (e.g., "true") AO values provided in the training data.

Figure 3A:
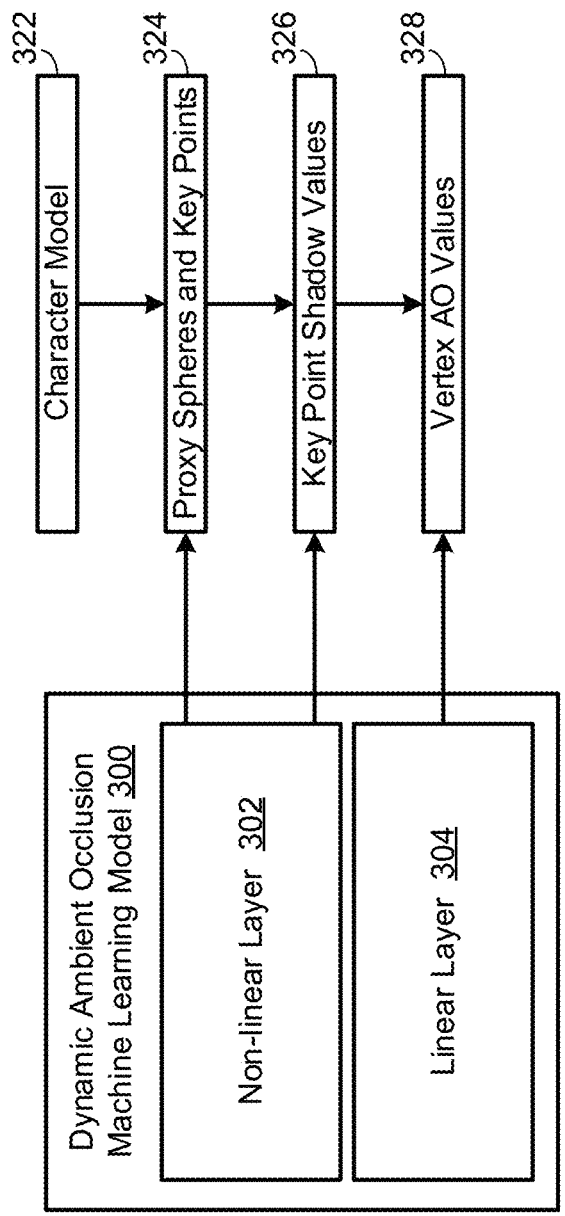
FIG. 3A illustrates a block diagram providing a visual summary of the layering used in a dynamic ambient occlusion approach, in accordance with embodiments of the present invention.

FIG. 3A provides a block diagram providing a visual summary of the layering used in this DAO approach. The dynamic ambient occlusion (DAO) machine learning model 300 may include a non-linear layer 302 and a linear layer 304. The non-linear layer 302 may serve to transform the character model 322 into an arrangement of proxy spheres and key points 324, with the positions of the proxy spheres and key points 324 based on the pose of the character model 322 (e.g., relative to a rest pose). The transformation of the character model 322 into proxy spheres and key points 324 may utilize parameters that have been fitted on training data. The non-linear layer 302 may also serve to calculate key point shadow values 326 (e.g., a shadow value for each key point) from the arrangement of the proxy spheres and key points 324. The linear layer 304 can then calculate per-vertex AO values 328 to be applied to the character model based on the key point shadow values 326. The per-vertex AO values 328 may be computed using parameters that have been fitted on training data.

Figure 3B:
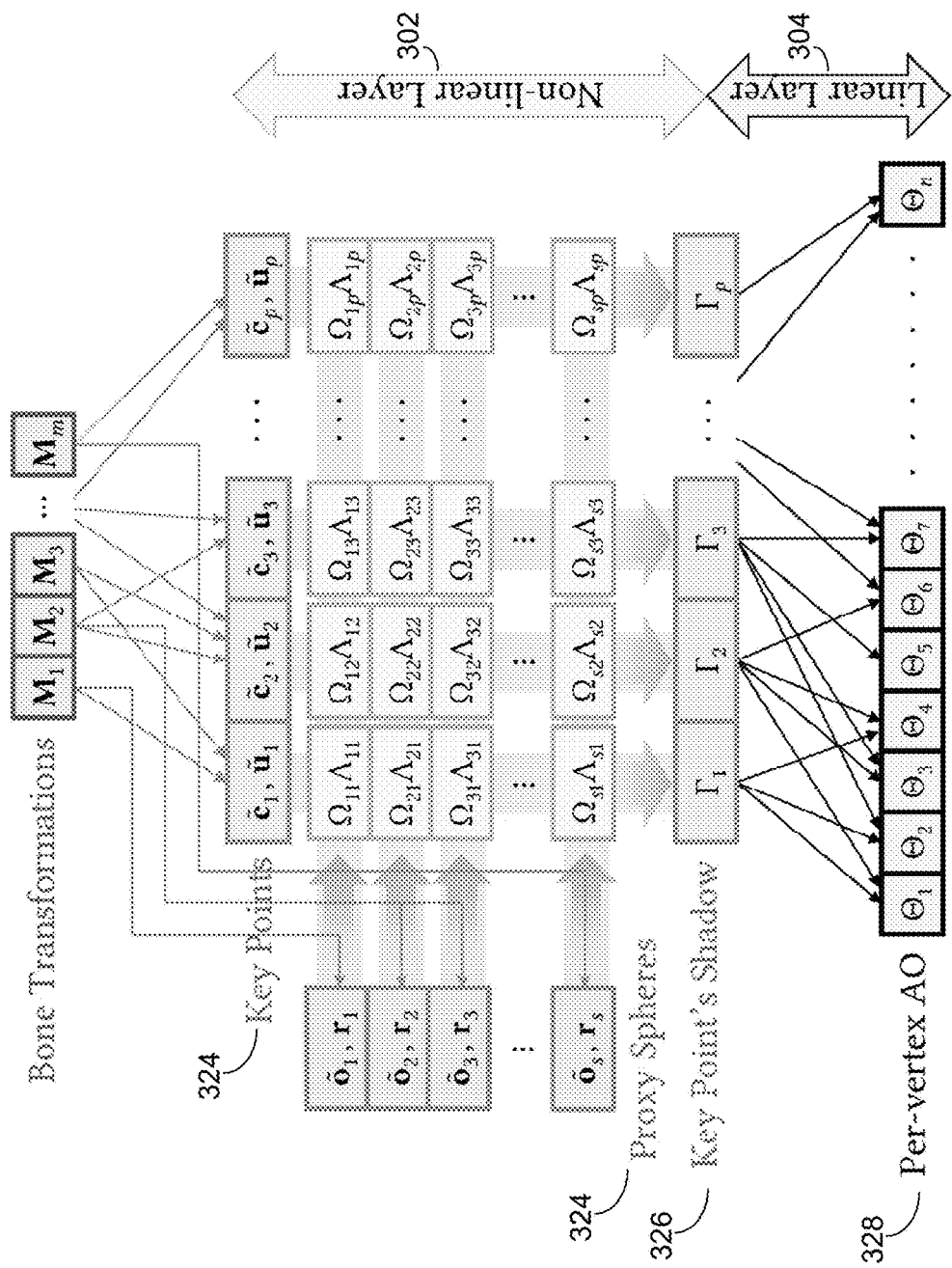
FIG. 3B illustrates a pipeline and various parameters of a computing model for a dynamic ambient occlusion approach, in accordance with embodiments of the present invention.

The layering in the DAO approach is shown in further detail in FIG. 3B, which illustrates the pipeline of the computing model and the various parameters that control the transformations of proxy spheres, the transformations of key points, and the per-vertex AO interpolations, all of which must be optimized by model fitting on training data.

For the computing model, the initial input is the skeleton pose $\mathbb{M}$ with m rigid bones (e.g., the skeletal structure and pose of the character model). The transformation of bone j=1 . . . m is denoted by the matrix, $M_j=[R_j|t_j]$ where $R_j \in \mathbb{R}^{3\times 3}$ is the rotation matrix and $t_j \in \mathbb{R}^3$ is the translation vector.

The parameters for fitting would include:

s proxy spheres, where s can be directly or indirectly controlled by the user. Proxy sphere h=1 . . . s is rigid bounded to bone b(h), i.e. sphere h will be transformed by $M_{b(h)}$ only. The center of h at the rest pose is $o_h \in \mathbb{R}^3$. The radius of h is $r_j \in \mathbb{R}$, which is unchanged during animation.

p key points, where p is set by the user. At the rest pose, the position and normal of key point k=1 . . . p are $c_k \in \mathbb{R}^3$ and $u_k \in \mathbb{R}^3$, respectively. Key point k is smoothly bound to m bones, i.e. it will be transformed by a linear blending of all $\{M_j|\forall_j=1 \ldots m\}$. Let $w_k \in \mathbb{R}^m$ be the blending weights of key point k, where $w_{kj}$ denotes the weight w.r.t. bone j. $w_k$ is sparse and affine.

n linear regression weights and biases, where n is the number of vertices of the model. The weights and bias of vertex i=1 . . . n are $\alpha_i \in \mathbb{R}^p$ and $\beta_i \in \mathbb{R}$, respectively, where $\alpha_{ik}$ denotes the weight w.r.t. key point k. $\alpha_i$ is sparse, non-negative, and soft-constrained affine. The number of non-zero values, $n_{nz}$, is defined by the users.

The output of the computing model is n per-vertex AO values, where $\theta_i \in \mathbb{R}$, $0 \leq \mathbb{R}_i \leq 1$ is the AO value at vertex i=1 . . . n.

Non-linear Layer, Detailed

The non-linear layer is inspired by the classical idea of approximating AO from sphere proxies with modifications to reduce stress on the run-time model and parameter optimization. The approach used avoids discontinuous, branching geometry intersections (intersect/no intersect) and replaces them with continuous, differentiable, non-branching approximations. First, the transformation of skeleton pose $\mathbb{M} = \{M_j | j=1 \ldots m\}$ on each proxy sphere h=1 . . . s and each key point k=1 . . . p is computed by using Eq. (1), where the tilde with super script ($\tilde{\bullet}^{\mathbb{M}_h}$) denotes the transformed position from the rest pose •, and normalize(•) denotes the vector normalization function. Each proxy sphere is rigid bound to one bone in the skeletal structure, so neither blending transformations nor changes in the radius of the proxy sphere need to be considered.

$$\tilde{o}_h^{\mathbb{M}} = R_{b(h)}o_h + t_{b(h)} \tag{1a}$$

$$\tilde{c}_k^{\mathbb{M}} = \sum_{j=1}^{m} w_{kj}(R_j c_k + t_j) \tag{1b}$$

$$\tilde{u}_k^{\mathbb{M}} = \text{normalize}\left(\sum_{j=1}^{m} w_{kj} R_j u_k\right) \tag{1c}$$

Figure 4:
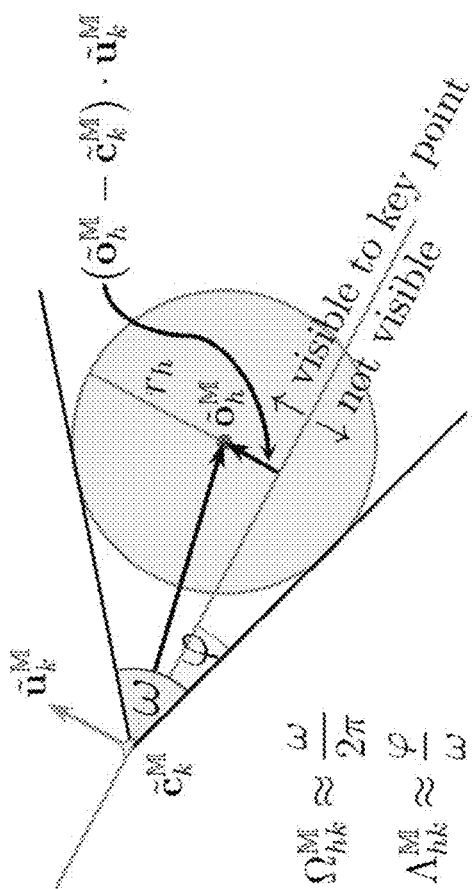
FIG. 4 illustrates the geometric relationship between a key point and a proxy sphere that is used to calculate the shadow the proxy sphere casts on the key point in a dynamic ambient occlusion approach, in accordance with embodiments of the present invention.

Then, the shadow of each proxy sphere h casting on key point k is computed as the product $\Omega^{\mathbb{M}}_{hk} \Lambda^{\mathbb{M}}_{hk}$, where $\Omega^{\mathbb{M}}_{hk}$ estimates the normalized solid angle that sphere h covers, i.e. solid angle scaled down by $2\pi$, and $\Lambda^{\mathbb{M}}_{hk}$ estimates its visibility ratio, i.e. ratio of h inside the hemisphere angle defined by $\tilde{u}^{\mathbb{M}}_k$. The normalization aims to scale $\Omega^{\mathbb{M}}_{hk} \Lambda^{\mathbb{M}}_{hk}$ in the range of [0, 1]. The intuition of $\Omega^{\mathbb{M}}_{hk}$ and $\Lambda^{\mathbb{M}}_{hk}$ is illustrated in FIG. 4, which illustrates the geometric relationship between a key point and a proxy sphere that is used to calculate the shadow the proxy sphere casts on the key point. Illustrated is the normalized solid angle $\Omega^{\mathbb{M}}_{hk}$ and the visibility ratio $\Lambda^{\mathbb{M}}_{hk}$ at key point k with respect to proxy sphere h. $\tilde{c}^{\mathbb{M}}_k$, and $\tilde{u}^{\mathbb{M}}_k$ are the position and the normal of the key point, respectively. $\tilde{o}^{\mathbb{M}}_h$ and $r_h$ are the center and the radius of the proxy sphere, respectively.

The normalized solid angle, $\Omega^{\mathbb{M}}_{hk}$, is computed with Eq. (2), where $\delta^{\mathbb{M}}_{hk}$ is the ratio between the distance from key point $\tilde{c}^{\mathbb{M}}_h$, to center $\tilde{o}^{\mathbb{M}}_h$, and the sphere radius $r_h$. Since the computing model uses simple spheres and points (with normals), $\Omega^{\mathbb{M}}_{hk}$ can be computed in closed-form:

$$\Omega^* = 1 - \sqrt{1 - 1/\delta^{\mathbb{M}}_{hk}{}^2}$$

However, this function is $C^1$ discontinuous at 1 and undefined with $\delta^{\mathbb{M}}_{hk} < 1$, i.e. key point k is inside proxy sphere h. $\Omega^*$ will not be convenient for the model training. For this reason, $\Omega^{\mathbb{M}}_{hk}$ is created by first plotting $\Omega^*$, then searching for an activation function that has a form like $\Omega^*$, and finally tuning coefficients to match with $\Omega^*$. The function $\Omega^{\mathbb{M}}_{hk}$ here is a softsign function that passes close to the point (1, 1).

$$\Omega^{\mathbb{M}}_{hk} = \frac{3}{4} - \frac{3(\delta^{\mathbb{M}}_{hk} - 1)}{1 + 4|\delta^{\mathbb{M}}_{hk} - 1|} \tag{2a}$$

$$\text{where: } \delta^{\mathbb{M}}_{hk} = \frac{\|\tilde{o}^{\mathbb{M}}_h - \tilde{c}^{\mathbb{M}}_k\|_2}{r_h} \tag{2b}$$

Figure 5A:
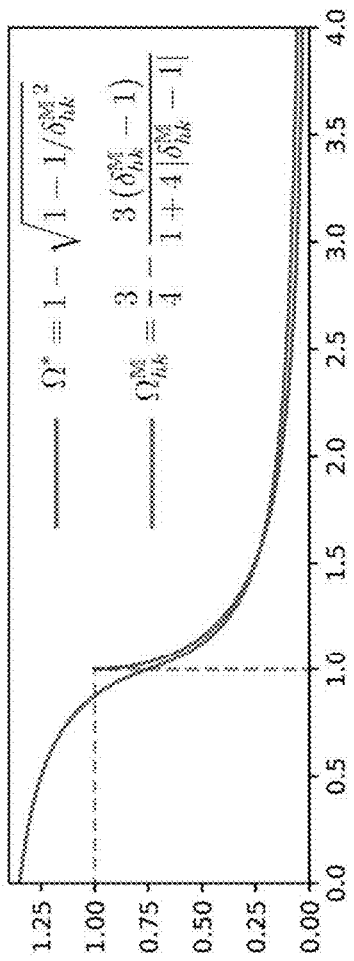
FIG. 5A illustrates a graph of the smooth normalized solid angle function that is used to calculating the shadow that each proxy sphere casts on a key point, in accordance with embodiments of the present invention.

FIG. 5A shows a graph of the smooth normalized solid angle function $\Omega^{\mathbb{M}}_{hk}$ and how it can approximate the closed-form function $\Omega^*$ and extrapolate to the range of $0 \leq \delta^{\mathbb{M}}_{hk} < 1$.

Figure 5B:
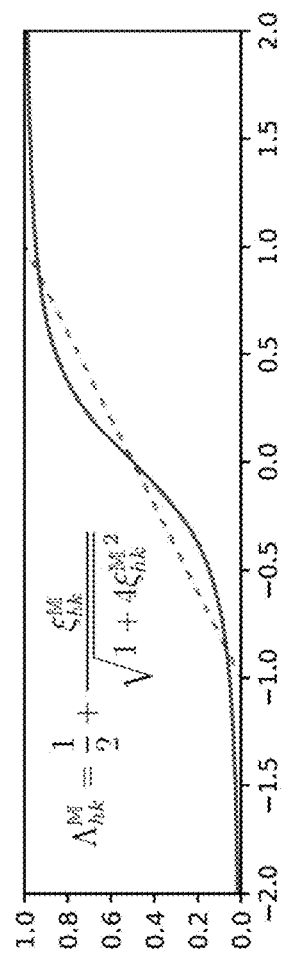
FIG. 5B illustrates a graph of the visibility ratio function that is used to calculating the shadow that each proxy sphere casts on a key point, in accordance with embodiments of the present invention.

The visibility ratio, $\Lambda^{\mathbb{M}}_{hk}$, is estimated in Eq. (3) from the signed projection length of the distance vector $\tilde{o}^{\mathbb{M}}_k - \tilde{c}^{\mathbb{M}}_h$, on the normal $\tilde{u}^{\mathbb{M}}_k$. Referring to the illustration in FIG. 5, we can see that proxy sphere h is totally visible ($\Omega=1$) if the signed projection length ($\tilde{o}^{\mathbb{M}}_h - \tilde{c}^{\mathbb{M}}_h$)· $\tilde{u}^{\mathbb{M}}_k \geq r_h$, i.e. $\xi^{\mathbb{M}}_{hk} \geq 1$, and h is totally not visible ($\Omega=0$) if ($\tilde{o}^{\mathbb{M}}_h - \tilde{c}^{\mathbb{M}}_h$)· $\tilde{u}^{\mathbb{M}}_k \leq -r_h$, i.e. $\xi^M_{hk} \leq -1$. Because this visibility function is discontinuous, visibility ratio function $\Lambda^M_{hk}$ is used instead as a sigmoid (algebraic) function. $\Lambda^M_{hk}$ is plotted in FIG. 5B. A previously-presented closed-form solution of this visibility problem is C1 discontinuous at $(\bar{o}^M_h - \check{c}^M_h) \cdot \check{u}^M_k = \pm r_h$.

$$\Lambda^M_{hk} = \frac{1}{2} + \frac{\xi^M_{hk}}{\sqrt{1 + 4\xi^{M2}_{hk}}} \quad (3a)$$

$$\text{where: } \xi^M_{hk} = \frac{(\bar{o}^M_h - \check{c}^M_k) \cdot \check{u}^M_k}{r_h} \quad (3b)$$

The sparse shadow value, $\Gamma^M_k$, at key point k, i.e. the output of the non-linear layer, is computed by adding contributions from all proxy spheres with a γ-norm function (Eq. (4)), where the parameter γ>1 is set by the users. The γ-norm function reduces double shadowing, i.e. spheres with overlapping solid angles will cast shadow twice, by emphasizing contributions from spheres with most shadow, i.e. sparsifying the contribution vector similar to the maximum norm (γ=∞). This γ-norm approximation significantly reduces the computation cost compared to the traditional geometry-based multi-pass technique, i.e. complexity is linear with the number of spheres compared to the quadratic order (two passes to remove double shadowing) or cubic order (three passes to add triple shadowing back).

$$\Gamma^M_k = \left( \sum_{h=1}^{s} (\Omega^M_{hk} \Lambda^M_{hk})^\gamma \right)^{\frac{1}{\gamma}} \quad (4)$$

Linear Layer, Detailed

In the linear layer, the AO value of vertex i at pose $\mathbb{M}$ is the linear combination of shadow values at key points $\Gamma^M_k$ followed by remapping back to the range of [0, 1] (Eq. (5)). Note that depending on the pose $\mathbb{M}$ and the parameters, the actual value of $\Theta^M_i$ could go out of the range [0, 1]. For rendering, this value can be clamped at the final step. The weight vector $\alpha_i$ is sparse, non-negative, and soft-constrained affine, i.e.

$$\sum_{k=1}^{p} \alpha_{ik} \approx 1$$

This soft affinity constraint is handled in the step for model fitting and solving for linear regression weights and biases. A regression bias $\beta_i$ is added to encode local detail at the vertex:

$$\Theta^M_i = 1 - \left( \sum_{k=1}^{p} \alpha_{ik} \Gamma^M_k + \beta_i \right) \quad (5)$$

Summary of Non-linear/Linear Layer Computations

Algorithm 1 shown below summarizes the AO computing steps. All foreach loops can be parallelized.

| ALGORITHM 1: Compute Per-vertex Ambient Occlusion |
|---|
| input : $\mathbb{M} = \{M_j | j = 1..m\}$, where $M_j = [R_j | t_j]$.<br>parameters : $\{o_h, r_h | h = 1..s\}$, $\{c_k, u_k | k = 1..p\}$,<br>$\{w_{kj} | k = 1..p, j = 1..m\}$, $\{\alpha_{ik}, \beta_i | i = 1..n, k = 1..p\}$.<br>output : $\{\Theta^M_i | i = 1..n\}$.<br>1 foreach proxy sphere h do<br>2    Compute center $\bar{o}^M_h$ ;   // Eq. (1a)<br>3 end<br>4 foreach key point k do<br>5    Compute position $\check{c}^M_k$ and normal $\check{u}^M_k$ ;   // Eqs. (1b) and (1c)<br>6    Compute shadow $\Gamma^M_k$ ;   // Eqs. (2), (3) and (4)<br>7 end<br>8 foreach vertex i do<br>9    Compute AO value $\Theta^M_i$ ;   // Eq. (5)<br>10 end |

Model Fitting

Figure 6:
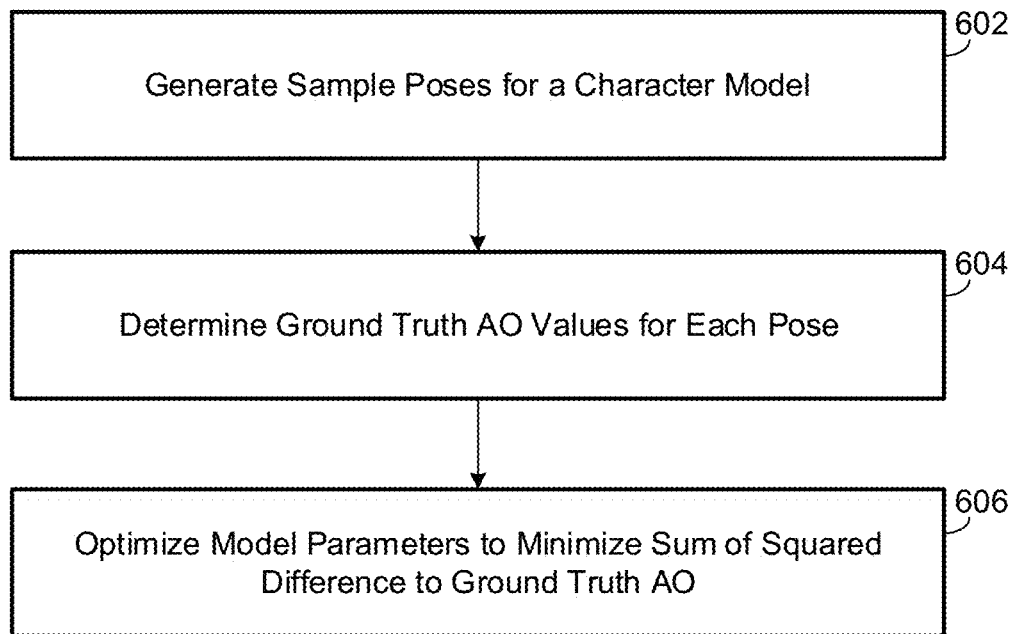
FIG. 6 is a flow chart illustrating a process for determining optimized parameters for a skinning model of a character under a dynamic ambient occlusion approach, in accordance with embodiments of the present invention.

FIG. 6 is a flow chart illustrating a process for how optimized parameters of the DAO computation model can be determined for a skinning model of a character.

At block 602, a set of sample poses may be generated for a character model. In some embodiments, the set of sample poses may be based on uniform, per-joint sampling. This uniform sampling is general without any special knowledge about the desired target animation. Per-joint sampling contains no combination of different joint rotations, i.e. not more than one joint is rotated at once, which keeps the size of the training data manageable. However, the model fitting can work with any off-the-shelf pose sampling, including artist-made poses.

At block 604, the ground truth AO values for each pose of the character model is determined. The ground truth AO values may be generated by ray tracing the character model in that pose. The set of sample poses and the ground truth AO values for each sample pose are used as training data. In some embodiments, ground truth AO values may be generated using single-bounce, GPU ray traced AO. However, the model fitting can work with any ground truth AO rendering, such as multibounce ray tracing.

At block 606, the DAO model parameters can be optimized (e.g., by a system such as the DAO system 100) to minimize the sum of squared difference with the ground truth AO values in the training data. In other words, the model parameters may be selected such that the AO values computed using the two layers described herein are close approximations to the ground truth AO values. The skinning deformation model (LBS) might generate self-intersecting output geometry. In that case, vertices at the self-intersections are rendered black, i.e. they are totally covered from the ambient light. The AO values at these vertices are treated as missing data and these values are continually updated using the prediction of the current model during training.

For the minimization of the sum of squared difference between calculated AO values and ground truth AO values, let f be the number of sample poses, where $\mathbb{M}^t = \{M_j^t | j = 1 \ldots m\}$ is the set of m bone transformations at pose $1 \leq t \leq f$. Let $0 \leq A_{ti} \leq 1$ be the AO value at vertex i of pose t. The minimization problem is:

$$\min E = \sum_{t=1}^{f} \sum_{i=1}^{n} (\Theta_i^{\mathbb{M}^t} - A_{ti})^2 \quad (6)$$

This function (6) for the sum of squared difference between calculated and ground truth AO values can be minimized using various computational methods. For instance, a random initialization could work, or through an initialization that utilizes the geometry properties of the skinning model for a good convergence.

In some embodiments, the function may be minimized by Block coordinate descent optimization, which alternatively updates: non-linear layer (spheres o, r, and key points c, u, w), linear layer ($\alpha$, $\beta$), and missing values. This approach is captured in Algorithm 2, which summarizes the computing steps.

The missing values are updated in the loop from line 8 to line 10, where $\phi$ is the set of all missing value positions in the matrix A, i.e. vertices i in the self-intersections at pose t. The algorithm stops when a desired number of iterations or relative tolerance is reached. For example, the algorithm may stop when the number of iterations reaches max_iters=500, or the relative tolerance $\varepsilon = 1e-3$ is reached, i.e. each parameter change less than $\varepsilon$ relatively to its current value.

---

ALGORITHM 2: Block Coordinate. Descent Optimization

```
input    : A ∈ ℝ^(f×n),
           {M_j^t | t = 1..f, j = 1..m},
           initialized values: o, r, c, u, w, α, β.
output   : {o_h, r_h | h = 1..s},
           {c_k, u_k | k = 1..p},
           {w_kj | k = 1..p, j = 1..m},
           {α_ik, β_i | i = 1..n, k = 1..p}.
1  repeat
2  |  Cache A and B ;                           // Eq. (7)
3  |  BFGS(max_local_iters) ;                   // §4.1
4  |  Cache C, d, and e ;                       // Eq. (8)
5  |  foreach vertex i do
6  |  |  Constrained LS solve α_i and β_i ;    // §4.2
7  |  end
8  |  foreach (t, i) ∈ φ do      // self-intersecting vertices
9  |  |   A_{t,i} ← Θ_i^{M̂^t} ;   // predict using current model
10 |  end
11 until max_iters iterations reached or relative tolerance ε reached;
```

---

The parameters for the non-linear layer (lines 2 and 3 in Algorithm 2) can be determined iteratively until a desired number of iterations is reached. For instance, the parameters of the non-linear layer can be determined by performing max_local_iters=20 iterations of the Broyden-Fletcher-Goldfarb-Shanno algorithm (BFGS). BFGS was chosen over other gradient-based optimizers because of its quadratic convergence rate, compared to the sub-linear convergence rate of gradient descent or the linear convergence rate of conjugate gradient descent.

The objective function (Eq. (6)) and its gradient can be effectively computed by re-arranging its terms while taking advantage of the parameters in linear layer ($\alpha$, $\beta$) being fixed:

$$E = \sum_{t=1}^{f} \sum_{i=1}^{n} (\Theta_i^{\mathbb{M}^t} - A_{ti})^2$$

$$= \sum_{t=1}^{f} \sum_{i=1}^{n} \left( 1 - \left( \sum_{k=1}^{p} \alpha_{ik} \Gamma_k^{\mathbb{M}^t} + \beta_i \right) - A_{ti} \right)^2$$

$$= \sum_{t=1}^{f} \sum_{i=1}^{n} \left( \sum_{k=1}^{p} \sum_{k'=1}^{p} \alpha_{ik} \alpha_{ik'} \Gamma_k^{\mathbb{M}^t} \Gamma_{k'}^{\mathbb{M}^t} + 2 \sum_{k=1}^{p} \alpha_{ik} (1 - \beta_i - A_{ti}) \Gamma_k^{\mathbb{M}^t} + \text{constant} \right)$$

$$= \sum_{t=1}^{f} \sum_{k=1}^{p} \sum_{k'=1}^{p} \left( \sum_{i=1}^{n} \alpha_{ik} \alpha_{ik'} \right) \Gamma_k^{\mathbb{M}^t} \Gamma_{k'}^{\mathbb{M}^t} + 2 \sum_{t=1}^{f} \sum_{k=1}^{p} \left( \sum_{i=1}^{n} \alpha_{ik} (1 - \beta_i - A_{ti}) \right) \Gamma_k^{\mathbb{M}^t} + \text{constant}$$

Then, $A_{kk'}$ and $B_{tk}$ can be pre-computed and cached to quickly evaluate the objective function (Eq. (7a)). The gradient of E is computed by explicitly computing each term $\Gamma_k^{\mathbb{M}^t}$ using chain rule, product and quotient rule. Caching $B_{kk'}$ and $B_{tk}$ significantly reduces the complexity of value/gradient evaluation by an order of n, i.e. the mesh resolution. A speed up of about two orders of magnitude was observed when utilizing caching.

$$E = \sum_{t=1}^{f} \sum_{k=1}^{p} \sum_{k'=1}^{p} \mathcal{A}_{kk'} \Gamma_k^{\mathbb{M}^t} \Gamma_{k'}^{\mathbb{M}^t} + 2 \sum_{t=1}^{f} \sum_{k=1}^{p} \mathcal{B}_{tk} \Gamma_k^{\mathbb{M}^t} + \text{constant} \quad (7a)$$

$$\text{where: } \mathcal{A}_{kk'} = \sum_{i=1}^{n} \alpha_{ik} \alpha_{ik'} \quad (7b)$$

$$\mathcal{B}_{tk} = \sum_{i=1}^{n} \alpha_{ik} (1 - \beta_i - A_{ti}) \quad (7c)$$

The unit-length constraints on normal vectors $u_k$, $\forall_x = 1 \ldots p$ are imposed by normalizing them before every objective function value evaluation in the BFGS optimization. The affinity constraints on blending weights $w_k$ are imposed by projecting the corresponding gradient $\nabla w_k$ to the hyper plane $$\Sigma_{j=1}^{m} \nabla_{w_{kj}} = 0.$$

The sparseness constraints on $w_k$ are imposed by not updating zero values, i.e. keeping the sparse matrix structure of w during the optimization.

For robustness, BFGS optimization is started with only updating normals u while keeping other parameters in the non-linear layer fixed. Then, until their relative values change less than $\epsilon = 1e-2$, the normals u, sphere positions o and radiuses r are updated. Finally, until their relative values change less than e, all parameters are updated.

The parameters for the linear layer (e.g., linear regression weights and biases for each vertex) can be determined by Constrained Linear Least-squares (LS) (lines 4 to line 7 in Algorithm 2). Similar to the caching for BFGS, the terms in the objective function are re-arranged so that the cross product $A^T_i A_i$ and $A^T_i b_i$ are elements in the cache matrix C, vector d, and vectors $\{e_i | i=1 \ldots n\}$:

$$E = \sum_{i=1}^{n} \left( (\alpha_i, \beta_i)^\top \begin{bmatrix} C & d \\ d^\top & f \end{bmatrix} (\alpha_i, \beta_i) - 2(\alpha_i, \beta_i)^\top e_i + \text{constant} \right) \quad (8a)$$

$$\text{where: } C_{kk'} = \sum_{t=1}^{f} \Gamma_k^{M^t} \Gamma_{k'}^{M^t} + \lambda \quad (8b)$$

$$d_k = \sum_{t=1}^{f} \Gamma_k^{M^t} \quad (8c)$$

$$e_{ik} = \sum_{t=1}^{f} (1 - \beta_i - A_{ti}) \Gamma_k^{M^t} + \lambda \quad (8d)$$

The soft-affinity constraint is used with the scaling parameter $\lambda = f$ (Eq. (8b) and Eq. (8d)).

Evaluation of Approach

FIG. 7 illustrates a table containing statistics associated with three character models used to test the DAO approach described herein. In the table, n denotes the number of vertices in the character model, m denotes the number of bones in the character model, $f$ denotes the number of training poses used, s denotes the number of proxy spheres, and p denotes the number of key points. For all models, the number of non-zero weights per vertex is set to $n_{nz}=8$ and the sparsifying norm $\gamma=1.5$. The errors $MSE_{init}$ and $MSE_{min}$ are the mean-square errors, i.e. $[1/(nf)]E$, at the initialization and the end of the training, respectively. time is the training time recorded on a computer with an 24-core 3.00 GHz CPU and Geforce GTX Titan V GPU. iters is the number of global iterations, where each global iteration contains 20 (local) nonlinear BFGS iterations and one linear solver step. $size_{data}$ is the size of the training data and $size_{model}$ is the size of the trained model (all parameters). Scalar values in the training data and AO model were stored as 32 bit floats and indices are stored as 32 bit integers.

Figure 8:
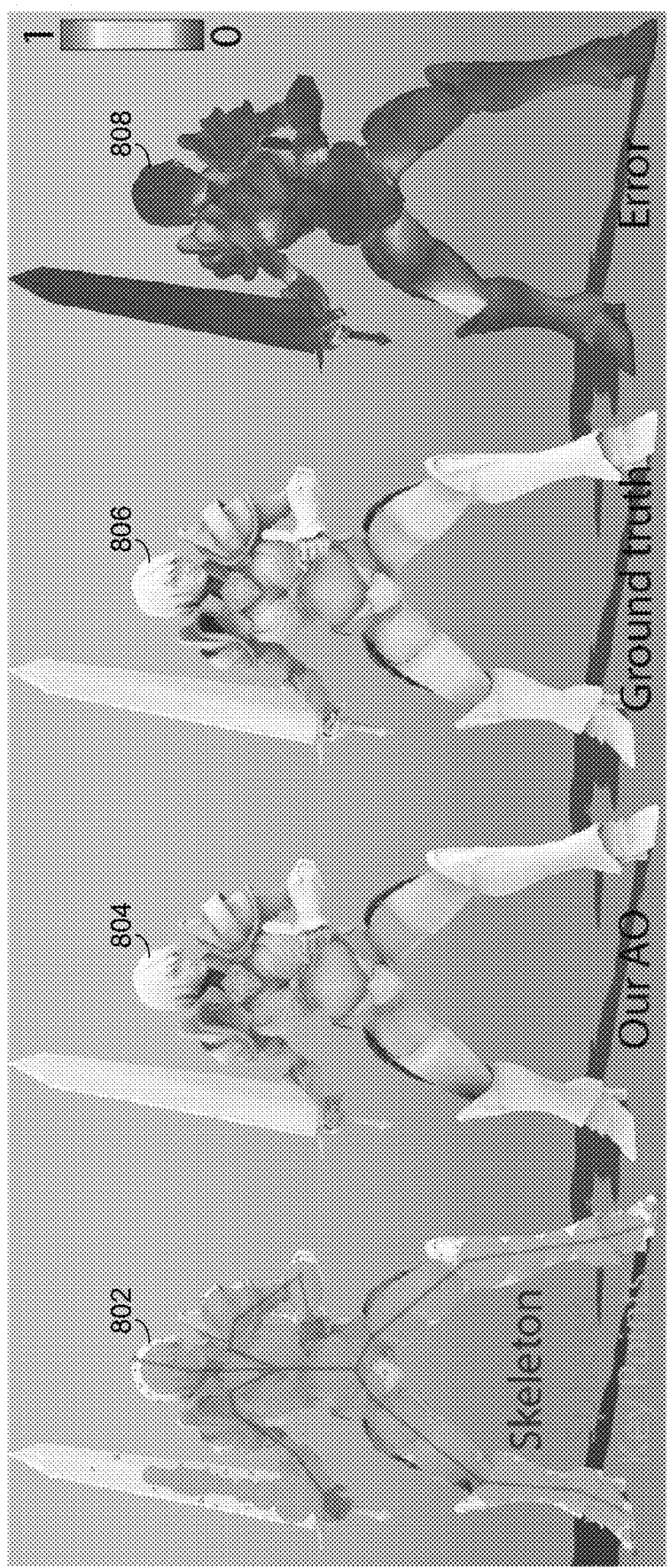
FIG. 8 illustrates an example visual comparison between results of a dynamic ambient occlusion approach and ground truth AO, in accordance with embodiments of the present invention.

FIG. 8 illustrates an example visual comparison between DAO results and ground truth AO. A visualization 802 of the proxy sphere and key points computed by the optimization algorithm for the non-linear layer of the DAO model is shown. It can be seen that the optimization robustly converged to a plausible solution as the sizes of the proxy spheres are roughly at the same size of corresponding body parts. A character model 804 rendered with per-vertex AO values computed from the DAO model is compared side-by-side with a character model 806 rendered with ground truth AO (using Nvidia's OptiX Prime ray tracer, in this instance). It can be seen that the character model 804 resulting from the DAO approach keeps mid-level surface details, despite the tested pose of the character model being quite different from the training poses (e.g., the neighbors of T-pose) used for parameter fitting. An error model 808 is also shown.

Figure 9:
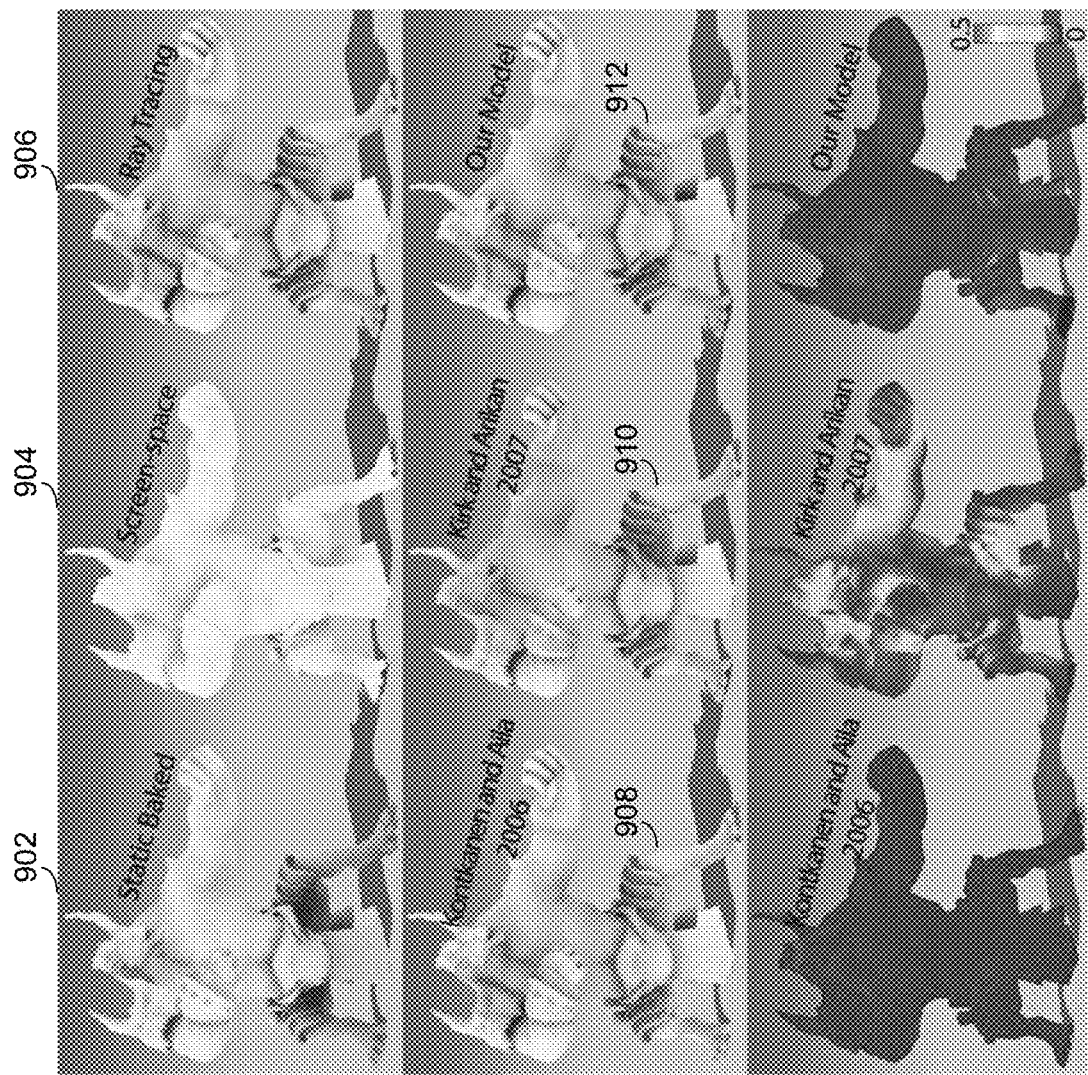
FIG. 9 illustrates an example visual comparison between different AO rendering methods including a dynamic ambient occlusion approach, in accordance with embodiments of the present invention.

FIG. 9 illustrates an example visual comparison between different AO rendering methods, including the DAO approach described herein.

Character model 902 is generated using static baked AO. Character model 904 is generated using traditional screen-space AO (SSAO) techniques. Despite a large radius used for the sampling area, SSAO appears flat due to its local computation. Character model 906 is generated by performing ray tracing at the rest pose with the same settings used to generate training data for the DAO model described herein. Also shown are character model 908, which is generated using a dynamic AO method targeted to characters that involves a linear regression from pose to the AO value, and character model 910, which is generated using a dynamic AO method for characters that involves a "piecewise linear" collection of locally linear models. A character model 912 generated using the DAO approach described herein is also shown.

The results show very low fitting errors with the character model 908 (e.g., Kontkanen and Aila's model) and character model 912 (e.g., the model rendered using the DAO approach described herein). Also, the reduced model (including clustering and principal component analysis) of Kirk and Arikan used to generate character model 910 appears to not be robust enough to capture the non-linear space for pose interpolation. In contrast, the combination of geometry-based clustering for model initialization and the joint-optimization on two layers used in the DAO approach converges to a good local optimized solution.

In order to compare the generalization of the different models, additional tests were performed, and in one the character pose was slightly moved off the last frame of the training sequence. The non-reduced linear model [Kontkanen and Aila 2006] associated with character model 908 suffered more from this perturbation than the Kirk and Arikan model associated with character model 910 and the DAO method used to generate character model 912. When training all the models with uniform joint rotation sampled data that does not contain complex poses (all training poses are the neighbors that differ from the T-pose by only one joint rotation) but provides good coverage for the joint rotation ranges, the Kirk and Arikan model associated with character model 910 underfits the training data and produces a large testing error.

Tests were also performed in order the compare the effects of model size. For real-time applications such as games, the size of the model is important not only for storage but also for loading time. Despite using a large amount of training data with a naïve sampling (sizedata as shown in FIG. 7), the DAO model results in a very small run-time model (sizemodel in FIG. 7). Even without compression, sizemodel is approximately as small as a single low-resolution texture (less than a megabyte). In theory, the size of the DAO model and the size of Kirk and Arikan's model are independent from the number of training poses, while the size of Kontkanen and Aila's model grows with the size of the training data. The DAO approach described herein not only provides higher AO quality, but the sizes of the trained AO model is significantly smaller than trained models from previous methods.

Thus, the DAO approach described herein outperformed previous methods [Kirk and Arikan 2007; Kontkanen and Aila 2006] in all comparisons. Although a well-designed training dataset could help address problems associated with the previous methods, with this DAO approach, it is easier to automate the process by not having to tune the training animation or the training parameters.

This DAO approach is also very flexible due to the non-linear component of the model. Intuitively, the proxy spheres and the key points are shadow blockers and light receivers, respectively. Proxy spheres/key points between different character models can be inter-connected to make lighting interactions and allow for integration without retraining the model parameters. For example, if interaction is desired between two characters, the set of proxy spheres for one character can be added to the other, and vice versa. As the result, when the two characters are close, they block the ambient light from each other. No model retraining would be needed to setup the character-character interactions. Furthermore, a ground AO effect can be added or simulating by adding a proxy sphere underneath the character (e.g., connecting x and z coordinates of the sphere to the root joint, assuming y is the up/down direction).

Figure 10:
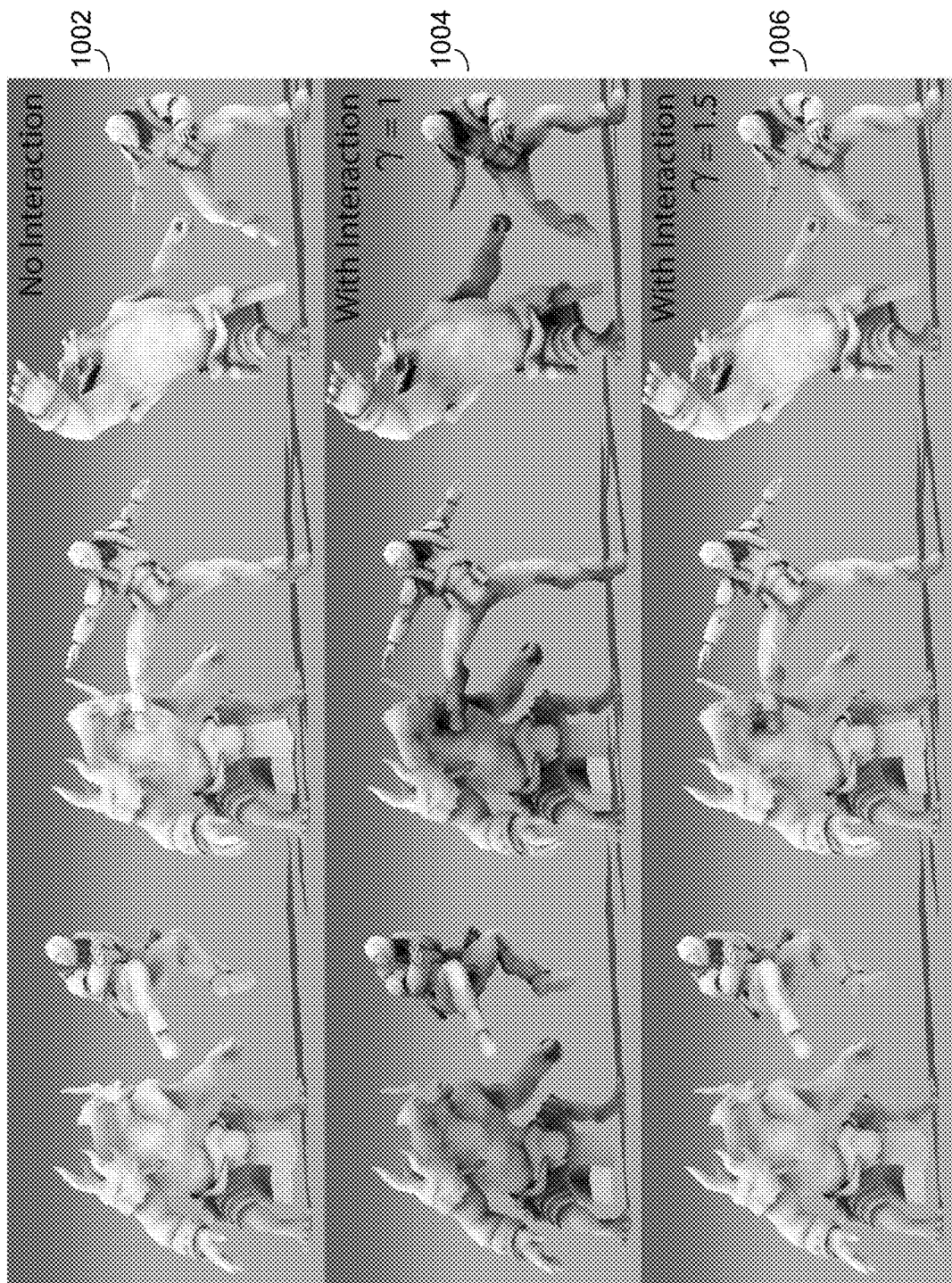
FIG. 10 illustrates a visual comparison for demonstrating techniques for cross-illumination between character models and also the reduction of double shadowing under a dynamic ambient occlusion approach, in accordance with embodiments of the present invention.

FIG. 10 illustrates a visual comparison for demonstrating techniques for cross-illumination between character models and also the reduction of double shadowing under the DAO approach described herein.

The top panel 1002 shows two individually-trained character models, when put together, do not have a global illumination effect. The middle panel 1004 shows cross-illumination between character models can be created by adding the set of proxy spheres of one character to the other character and vice versa. However, double shadowing makes the resulting AO appear very dark. The bottom panel 1006 shows the effect of $\gamma$-norm sparsification ($\gamma=1.5$) for reducing double shadowing while still keeping the cross-illumination effect between the character models. This is a further side benefit of the interpretability of our model.

Example Hardware Configuration of Computing System

Figure 11:
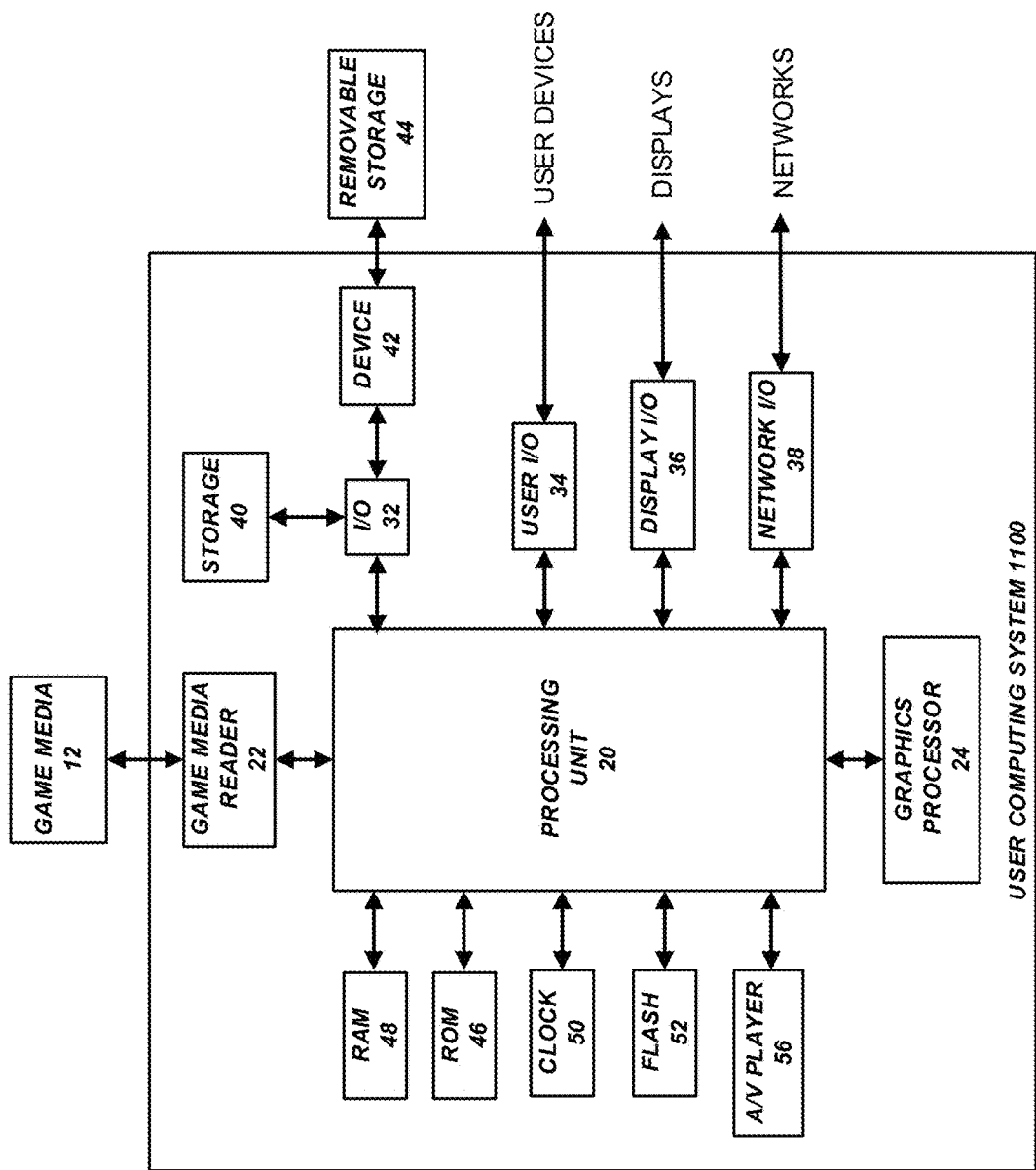
FIG. 11 illustrates an embodiment of a hardware configuration for a computing system usable with embodiments of the present disclosure.

FIG. 11 illustrates an embodiment of a hardware configuration for a computing system 1100 (e.g., user device 130 and/or DAO system 100 of FIG. 1). Other variations of the computing system 1100 may be substituted for the examples explicitly presented herein, such as removing or adding components to the computing system 1100. The computing system 1100 may include a computer, a server, a smart phone, a tablet, a personal computer, a desktop, a laptop, a smart television, and the like.

As shown, the computing system 1100 includes a processing unit 20 that interacts with other components of the computing system 800 and also components external to the computing system 1100. A game media reader 22 may be included that can communicate with game media. Game media reader 22 may be an optical disc reader capable of reading optical discs, such as CD-ROM or DVDs, or any other type of reader that can receive and read data from game media. In some embodiments, the game media reader 22 may be optional or omitted. For example, game content or applications may be accessed over a network via the network I/O 38 rendering the game media reader 22 and/or the game media optional.

The computing system 1100 may include a separate graphics processor 24. In some cases, the graphics processor 24 may be built into the processing unit 20, such as with an APU. In some such cases, the graphics processor 24 may share Random Access Memory (RAM) with the processing unit 20. Alternatively, or in addition, the computing system 1100 may include a discrete graphics processor 24 that is separate from the processing unit 20. In some such cases, the graphics processor 24 may have separate RAM from the processing unit 20. Further, in some cases, the graphics processor 24 may work in conjunction with one or more additional graphics processors and/or with an embedded or non-discrete graphics processing unit, which may be embedded into a motherboard and which is sometimes referred to as an on-board graphics chip or device.

The computing system 1100 also includes various components for enabling input/output, such as an I/O 32, a user interface I/O 34, a display I/O 36, and a network I/O 38. As previously described, the input/output components may, in some cases, including touch-enabled devices. The I/O 32 interacts with storage element 40 and, through a device 42, removable storage media 44 in order to provide storage for the computing system 1100. The storage element 40 can store a database that includes the failure signatures, clusters, families, and groups of families. Processing unit 20 can communicate through I/O 32 to store data, such as game state data and any shared data files. In addition to storage 40 and removable storage media 44, the computing system 1100 is also shown including ROM (Read-Only Memory) 46 and RAM 48. RAM 48 may be used for data that is accessed frequently, such as when a game is being played, or for all data that is accessed by the processing unit 20 and/or the graphics processor 24.

User I/O 34 is used to send and receive commands between processing unit 20 and user devices, such as game controllers. In some embodiments, the user I/O 34 can include touchscreen inputs. As previously described, the touchscreen can be a capacitive touchscreen, a resistive touchscreen, or other type of touchscreen technology that is configured to receive user input through tactile inputs from the user. Display I/O 36 provides input/output functions that are used to display images from the game being played. Network I/O 38 is used for input/output functions for a network. Network I/O 38 may be used during execution of a game, such as when a game is being played online or being accessed online.

Display output signals may be produced by the display I/O 36 and can include signals for displaying visual content produced by the computing system 800 on a display device, such as graphics, user interfaces, video, and/or other visual content. The computing system 1100 may comprise one or more integrated displays configured to receive display output signals produced by the display I/O 36, which may be output for display to a user. According to some embodiments, display output signals produced by the display I/O 36 may also be output to one or more display devices external to the computing system 1100.

The computing system 1100 can also include other features that may be used with a game, such as a clock 50, flash memory 52, and other components. An audio/video player 56 might also be used to play a video sequence, such as a movie. It should be understood that other components may be provided in the computing system 1100 and that a person skilled in the art will appreciate other variations of the computing system 1100.

Program code can be stored in ROM 46, RAM 48, or storage 40 (which might comprise hard disk, other magnetic storage, optical storage, solid state drives, and/or other non-volatile storage, or a combination or variation of these). At least part of the program code can be stored in ROM that is programmable (ROM, PROM, EPROM, EEPROM, and so forth), in storage 40, and/or on removable media such as game media 12 (which can be a CD-ROM, cartridge, memory chip or the like, or obtained over a network or other electronic channel as needed). In general, program code can be found embodied in a tangible non-transitory signal-bearing medium.

Random access memory (RAM) 48 (and possibly other storage) is usable to store variables and other game and processor data as needed. RAM is used and holds data that is generated during the play of the game and portions thereof might also be reserved for frame buffers, game state and/or other data needed or usable for interpreting user input and generating game displays. Generally, RAM 48 is volatile storage and data stored within RAM 48 may be lost when the computing system 1100 is turned off or loses power.

As computing system 1100 reads game media 12 and provides a game, information may be read from game media 12 and stored in a memory device, such as RAM 48. Additionally, data from storage 40, ROM 46, servers accessed via a network (not shown), or removable storage media 44 may be read and loaded into RAM 48. Although data is described as being found in RAM 48, it will be understood that data does not have to be stored in RAM 48 and may be stored in other memory accessible to processing unit 20 or distributed among several media, such as game media 12 and storage 40.

It is to be understood that not necessarily all objects or advantages may be achieved in accordance with any particular embodiment described herein. Thus, for example, those skilled in the art will recognize that certain embodiments may be configured to operate in a manner that achieves, increases, or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, and the like, may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A computer-implemented method comprising:
   during runtime execution of a video game application on a user computing device,
   applying a non-linear layer of a machine-learning model to a three-dimensional (3D) virtual character model in order to:
   generate an arrangement of elements representative of a pose of the 3D virtual character model;
   compute shadow values for elements in the arrangement, wherein individual shadow values are based at least in part on a shadow cast by at least one of the elements in the arrangement;

applying a linear layer of the machine-learning model in order to:
  calculate ambient occlusion values for the 3D virtual character model based at least in part on the shadow values for the elements in the arrangement; and
rendering a frame including at least a portion of the 3D virtual character model based at least in part on the calculated ambient occlusion values.

2. The method of claim 1, wherein the arrangement is generated based on a first set of optimized parameters determined from training data.

3. The method of claim 1, wherein the elements comprise proxy spheres and key points, and further comprising determining, for each key point in the arrangement, a shadow cast by each proxy sphere in the arrangement on a respective key point, wherein the shadow values are based collectively on the shadow cast by each proxy sphere in the arrangement on the respective key point.

4. The method of claim 3, wherein calculating an ambient occlusion value further comprises calculating the ambient occlusion value for a vertex of the 3D virtual character model based on the shadow values for a plurality of key points in the arrangement near the vertex.

5. The method of claim 4, wherein the ambient occlusion value for the vertex is generated based on a second set of optimized parameters determined from training data.

6. The method of claim 1, further comprising determining a first set of optimized parameters for generating the arrangement from training data, wherein the first set of optimized parameters minimizes a sum of square distance between ambient occlusion values calculated using the machine-learning model and corresponding ground truth ambient occlusion values in the training data.

7. The method of claim 1, wherein a position of elements in the arrangement changes based on the pose of the 3D virtual character model.

8. A computing system, comprising:
one or more processing devices configured to execute instructions in order to:
  apply a non-linear layer of a machine-learning model to a three-dimensional (3D) virtual character model in order to:
    generate an arrangement of elements representative of a pose of the 3D virtual character model;
    compute shadow values for elements in the arrangement, wherein individual shadow values are based at least in part on a shadow cast by at least one of the elements in the arrangement;
  apply a linear layer of the machine-learning model in order to:
    calculate ambient occlusion values for the 3D virtual character model based at least in part on the shadow values for the elements in the arrangement; and
  render a frame including at least a portion of the 3D virtual character model based at least in part on the calculated ambient occlusion values.

9. The computing system of claim 8, wherein the arrangement is generated based on a first set of optimized parameters determined from training data.

10. The computing system of claim 8, wherein the elements comprise proxy spheres and key points, and further comprising determining, for each key point in the arrangement, a shadow cast by each proxy sphere in the arrangement on a respective key point, wherein the shadow values are based collectively on the shadow cast by each proxy sphere in the arrangement on the respective key point.

11. The computing system of claim 10, wherein calculating an ambient occlusion value further comprises calculating the ambient occlusion value for a vertex of the 3D virtual character model based on the shadow values for a plurality of key points in the arrangement near the vertex.

12. The computing system of claim 11, wherein the ambient occlusion value for the vertex is generated based on a second set of optimized parameters determined from training data.

13. The computing system of claim 8, wherein the one or more processing devices are further configured to execute instructions in order to determine a first set of optimized parameters for generating the arrangement from training data, wherein the first set of optimized parameters minimizes a sum of square distance between ambient occlusion values calculated using the machine-learning model and corresponding ground truth ambient occlusion values in the training data.

14. The computing system of claim 8, wherein a position of elements in the arrangement changes based on the pose of the 3D virtual character model.

15. Non-transitory computer readable storage media comprising computer-executable instructions that, when executed by a computing system, cause the computing system to:
apply a non-linear layer of a machine-learning model to a three-dimensional (3D) virtual character model in order to:
  generate an arrangement of elements representative of a pose of the 3D virtual character model;
  compute shadow values for elements in the arrangement, wherein individual shadow values are based at least in part on a shadow cast by at least one of the elements in the arrangement;
apply a linear layer of the machine-learning model in order to:
  calculate ambient occlusion values for the 3D virtual character model based at least in part on the shadow values for the elements in the arrangement; and
render a frame including at least a portion of the 3D virtual character model based at least in part on the calculated ambient occlusion values.

16. The non-transitory computer readable storage media of claim 15, wherein the arrangement is generated based on a first set of optimized parameters determined from training data.

17. The non-transitory computer readable storage media of claim 15, wherein the elements comprise proxy spheres and key points, and further comprising determining, for each key point in the arrangement, a shadow cast by each proxy sphere in the arrangement on a respective key point, wherein the shadow values are based collectively on the shadow cast by each proxy sphere in the arrangement on the respective key point.

18. The non-transitory computer readable storage media of claim 17, wherein calculating an ambient occlusion value further comprises calculating the ambient occlusion value for a vertex of the 3D virtual character model based on the shadow values for a plurality of key points in the arrangement near the vertex.

19. The non-transitory computer readable storage media of claim 18, wherein the ambient occlusion value for the vertex is generated based on a second set of optimized parameters determined from training data.

20. The non-transitory computer readable storage media of claim 15, wherein the computer-executable instructions, when executed by the computing system, further cause the computing system to determine a first set of optimized parameters for generating the arrangement from training data, wherein the first set of optimized parameters minimizes a sum of square distance between ambient occlusion values calculated using the machine-learning model and corresponding ground truth ambient occlusion values in the training data.

* * * * *

UNITED STATES PATENT AND TRADEMARK OFFICE
CERTIFICATE OF CORRECTION

PATENT NO. : 12,249,025 B2
APPLICATION NO. : 18/528526
DATED : March 11, 2025
INVENTOR(S) : Binh Huy Le et al.

Page 1 of 1

It is certified that error appears in the above-identified patent and that said Letters Patent is hereby corrected as shown below:

In the Specification

Column 11, Line 46 (approx.), delete "$\mathbb{R}, 0 \leq \mathbb{R}_i \leq 1$" and insert -- $\mathbb{R}, 0 \leq \Theta_i \leq 1$ --.

Column 12, Line 25 (approx.), delete "$č^M{}_k,$" and insert -- $č^M_k$ --.

Column 12, Line 30 (approx.), delete "$č^M{}_h,$" and insert -- $č^M_h$ --.

Column 12, Line 30 (approx.), delete "$õ^M{}_h,$" and insert -- $õ^M_h$ --.

Column 12, Line 61 (approx.), delete "$õ^M{}_k - č^M{}_h,$" and insert -- $õ^M_h - č^M_h$ --.

Column 13, Line 64, delete "$\Theta^M$ ;" and insert -- $\Theta^M_i$ --.

Column 16, Line 31 (approx.), delete "$B_{kk'}$" and insert -- $A_{kk'}$ --.

Column 16, Line 48 (approx.), delete "$\forall_x = 1$" and insert -- $\forall_k = 1$ --.

Column 16, Line 63, delete "than e, all" and insert -- than $\epsilon$, all --.

Column 17, Line 36, delete "and Geforce GTX" and insert -- and GeForce GTX --.

Column 18, Line 46, delete "model are independent" and insert -- model [2007] are independent --.

Column 18, Line 48, delete "model grows with" and insert -- model [2006] grows with --.

Signed and Sealed this
Twenty-sixth Day of August, 2025

Coke Morgan Stewart
*Acting Director of the United States Patent and Trademark Office*